(12) United States Patent
Zhu et al.

(10) Patent No.: US 11,983,853 B1
(45) Date of Patent: May 14, 2024

(54) TECHNIQUES FOR GENERATING TRAINING DATA FOR MACHINE LEARNING ENABLED IMAGE ENHANCEMENT

(71) Applicant: Meta Platforms, Inc., Menlo Park, CA (US)

(72) Inventors: Bo Zhu, Charlestown, MA (US); Haitao Yang, Boston, MA (US); Liying Shen, Charlestown, MA (US); Ege Ozgirin, Cambridge, MA (US)

(73) Assignee: Meta Plattforms, Inc., Menlo Park, CA (US)

( * ) Notice: Subject to any disclaimer, the term of this patent is extended or adjusted under 35 U.S.C. 154(b) by 0 days.

(21) Appl. No.: 17/087,491

(22) Filed: Nov. 2, 2020

Related U.S. Application Data

(60) Provisional application No. 62/928,831, filed on Oct. 31, 2019, provisional application No. 62/928,780, filed on Oct. 31, 2019.

(51) Int. Cl.
*G06T 5/50* (2006.01)
*G06N 3/08* (2023.01)
*G06T 5/00* (2006.01)

(52) U.S. Cl.
CPC ................. *G06T 5/50* (2013.01); *G06N 3/08* (2013.01); *G06T 5/002* (2013.01);
(Continued)

(58) Field of Classification Search
CPC . G06T 5/50; G06T 5/002; G06T 2207/10024; G06T 2207/20021;
(Continued)

(56) References Cited

U.S. PATENT DOCUMENTS 10,032,256 B1 * 7/2018 Anaya ..................... G06T 5/002
10,325,351 B2    6/2019 Rad et al.
(Continued)

OTHER PUBLICATIONS

Foi et al., "Practical Poissonian-Gaussian noise modeling and fitting for single-image raw-data", IEEE Transactions on Image Processing, vol. 17, Issue 10, Oct. 2008, pp. 1737-1754.
(Continued)

*Primary Examiner* — Xuemei G Chen
(74) *Attorney, Agent, or Firm* — BakerHostetler

(57) ABSTRACT

Systems and methods for generating training data using synthesized input images for training a machine learning model for image enhancement in accordance with embodiments of the invention are described. The system may access a target image (e.g., captured by an imaging device), and generate an input image that corresponds to the target image. The input image and target image may then be used (e.g., as part of a training data set) to train the machine learning model. For example, a generated input image corresponding to a target image may represent a version of the target image as if it were captured in low light. The target image may be a target illuminated output to be generated by enhancing the input image. The input image and target image may be used to train a machine learning model to enhance images such as those captured in low light.

23 Claims, 15 Drawing Sheets
(2 of 15 Drawing Sheet(s) Filed in Color)

(52) U.S. Cl.
  CPC ............... *G06T 2207/10024* (2013.01); *G06T 2207/20021* (2013.01); *G06T 2207/20081* (2013.01); *G06T 2207/20212* (2013.01)

(58) Field of Classification Search
  CPC .......... G06T 2207/20081; G06T 2207/20212; G06N 3/08
  See application file for complete search history.

(56) References Cited

U.S. PATENT DOCUMENTS

| | | | |
|---|---|---|---|
| 2009/0295927 A1* | 12/2009 | Ohtake | G06V 40/162 348/207.1 |
| 2010/0080459 A1* | 4/2010 | Dai | G06T 5/009 382/170 |
| 2011/0141371 A1* | 6/2011 | Lo | H04N 5/57 348/673 |
| 2014/0153054 A1* | 6/2014 | Nishizawa | H04N 1/4052 358/3.03 |
| 2016/0189354 A1* | 6/2016 | Kikuchi | G06T 5/40 382/167 |
| 2016/0239964 A1* | 8/2016 | Haugen | G06V 20/695 |
| 2017/0064177 A1* | 3/2017 | Sekine | H04N 23/73 |
| 2017/0332041 A1 | 11/2017 | Ranbro | |
| 2017/0337682 A1 | 11/2017 | Liao et al. | |
| 2019/0087648 A1* | 3/2019 | Du | G06N 3/0454 |
| 2019/0257767 A1 | 8/2019 | Shaubi et al. | |
| 2020/0020097 A1 | 1/2020 | Do et al. | |
| 2020/0051260 A1* | 2/2020 | Shen | G06N 3/04 |
| 2020/0092457 A1* | 3/2020 | Wang | H04N 23/90 |
| 2020/0184925 A1* | 6/2020 | Huang | G09G 5/10 |
| 2020/0234414 A1* | 7/2020 | Zamir | G06T 5/001 |
| 2020/0242331 A1* | 7/2020 | Song | G06T 7/55 |
| 2020/0279358 A1* | 9/2020 | Li | G06V 10/82 |
| 2020/0285901 A1 | 9/2020 | Hiasa | |
| 2020/0387785 A1 | 12/2020 | He et al. | |
| 2020/0401850 A1 | 12/2020 | Bazarsky et al. | |
| 2021/0027162 A1* | 1/2021 | Yang | G06F 7/5443 |
| 2021/0033404 A1 | 2/2021 | Lawlor et al. | |
| 2021/0051317 A1* | 2/2021 | Yan | G06T 7/80 |
| 2021/0104313 A1 | 4/2021 | Mizobe et al. | |
| 2021/0390696 A1 | 12/2021 | Iwase et al. | |
| 2021/0398254 A1 | 12/2021 | Oshikawa et al. | |
| 2022/0019805 A1* | 1/2022 | Zou | G06K 9/6277 |
| 2022/0031227 A1 | 2/2022 | Cho et al. | |

OTHER PUBLICATIONS

Wang et al., "Enhancing Low Light Videos by Exploring High Sensitivity Camera Noise", 2019 IEEE/CVF International Conference on Computer Vision (ICCV), Oct. 27-Nov. 2, 2019, pp. 4110-4118.

Wei et al., "A Physics-based Noise Formation Model for Extreme Low-light Raw Denoising", Proceedings of the IEEE/CVF Conference on Computer Vision and Pattern Recognition (CVPR), 2020, pp. 2758-2767.

* cited by examiner

US 11,983,853 B1

TECHNIQUES FOR GENERATING TRAINING DATA FOR MACHINE LEARNING ENABLED IMAGE ENHANCEMENT

RELATED APPLICATIONS

The present application claims priority to U.S. Provisional Patent Application Ser. No. 62/928,780 entitled "Techniques for Generating Training Data for Machine Learning Enabled Image Enhancement," to Zhu et al., filed Oct. 31, 2019, and to U.S. Provisional Patent Application Ser. No. 62/928,831 entitled "Systems and Methods for Removing Perturbations from Images and Image Sequences," to Ozgirin et al., filed Oct. 31, 2019, the disclosures of which are hereby incorporated by reference in their entirety.

FIELD OF THE DISCLOSURE

The techniques described herein relate generally to methods and apparatus for using artificial intelligence (AI) techniques to enhance images, including techniques for obtaining training data to train AI techniques for image enhancement.

BACKGROUND

Images (e.g., digital images, video frames, etc.) may be captured by many different types of devices. For example, video recording devices, digital cameras, image sensors, medical imaging devices, electromagnetic field sensing, and/or acoustic monitoring devices may be used to capture images. Captured images may be of poor quality as a result of the environment or conditions in which the images were captured. For example, images captured in dark environments and/or under poor lighting conditions may be of poor quality, such that the majority of the image is largely dark and/or noisy. Captured images may also be of poor quality due to physical constraints of the device, such as devices that use low-cost and/or low-quality imaging sensors.

In addition, images may be captured in environments with perturbations such as snow, rain, haze, dust, and/or glare, resulting in captured images that are poor quality and/or noisy. Furthermore, motion of the device during image capture may cause and/or exacerbate poor quality or noise in the captured images.

SUMMARY

Described herein are systems and computerized techniques for generating training data for training a machine learning model for image enhancement. The machine learning model can be used to enhance poor quality images, such as images that are captured in low light conditions and/or noisy images. In contrast to existing techniques that require physically capturing input and output images to generate the training data to train a model, the techniques described herein provide for generating aspects of the training data. Some embodiments, for example, provide for generating input images based on the output images. Since it can take longer to physically capture the input images (e.g., which may require longer exposure times), being able to generate the input images based on the output images can both save time and/or allow for capturing input and output training data of scenes that otherwise cannot be used for training data (e.g., for scenes with motion, since physically captured input images may exhibit blur).

Some embodiments relate to a method of training a machine learning model for enhancing images. The method includes using at least one computer hardware processor to perform accessing a target image representing a target output of the machine learning model, generating an input image corresponding to the target image, and training the machine learning model using the target image and the generated input image corresponding to the target image to obtain a trained machine learning model. Generating the input image corresponding to the target image includes identifying a first target image pixel value, identifying a first set of predetermined pixel values based on the first target image pixel value, selecting a pixel value from the first set of predetermined pixel values, and setting a first pixel in the input image to the pixel value selected from the first set of predetermined pixel values.

Some embodiments relate to an apparatus for training a machine learning model for enhancing images. The apparatus includes at least one hardware processor, and at least one non-transitory computer-readable storage medium storing processor-executable instructions that, when executed by the at least one hardware processor, cause the at least one hardware processor to perform accessing a target image representing a target output of the machine learning model, generating an input image corresponding to the target image, and training the machine learning model using the target image and the generated input image corresponding to the target image to obtain a trained machine learning model. Generating the input image corresponding to the target image includes identifying a first target image pixel value, identifying a first set of predetermined pixel values based on the first target image pixel value, selecting a pixel value from the first set of predetermined pixel values, and setting a first pixel in the input image to the pixel value selected from the first set of predetermined pixel values.

Some embodiments relate to at least one computer readable storage medium storing processor-executable instructions that, when executed by at least one processor, cause the at least one processor to perform accessing a target image representing a target output of the machine learning model, generating an input image corresponding to the target image, and training the machine learning model using the target image and the generated input image corresponding to the target image to obtain a trained machine learning model. Generating the input image corresponding to the target image includes identifying a first target image pixel value, identifying a first set of predetermined pixel values based on the first target image pixel value, selecting a pixel value from the first set of predetermined pixel values, and setting a first pixel in the input image to the pixel value selected from the first set of predetermined pixel values.

The system may access a target image (e.g., captured by a digital camera), and generate a corresponding input image that corresponds to the target image. In some embodiments, a camera can capture a series of input images (e.g., dark images) of an object (e.g., displaying a predetermined color pattern) at a similar and/or same shutter speed (e.g., 1/15th of a second, 1/30th of a second, etc.), and combine the series of input images to generate a corresponding reference image. The techniques can include generating a mapping between the illumination data of the reference image (e.g., RGB pixel values, raw Bayer pattern values, thermal/infrared sensor data, and/or the like) to the illumination data of the input images (e.g., RGB pixel values, raw Bayer pattern values, thermal/infrared sensor data, and/or the like). The techniques can include using the reference/input illumination data mapping to generate input images corresponding to target images. In some embodiments, the two input and target data sets (e.g., captured and/or generated as described herein) can be used to compute a probability distribution function (PDF) of pixel values, which can then be sampled from to simulate any input image (e.g. dark image) from an output reference image (e.g., bright image).

The input images and target images may then be used to train the machine learning model. For example, the system may apply a supervised learning algorithm to a training data set that includes a series of generated input images and associated target images. In some embodiments, the system may generate an input image corresponding to a target image that simulates a version of the target image captured in low light. Thus the target image may be an image captured under normal lighting conditions (e.g., referred to herein as a "bright image"), and the input image may represent an image that would be captured by an imaging device in low light (e.g., referred to herein as a "dark image").

In some embodiments, the machine learning model can be used to process dark images to generate corresponding bright images. The target image may represent target illuminated output (e.g., such as red, green and/or blue values) to be generated by enhancing illumination of the dark image. Thus, training data that includes a set of dark images and corresponding target images may be used to train a machine learning model that can be used to enhance images captured in low light conditions by illuminating the images.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

Figure 1A:
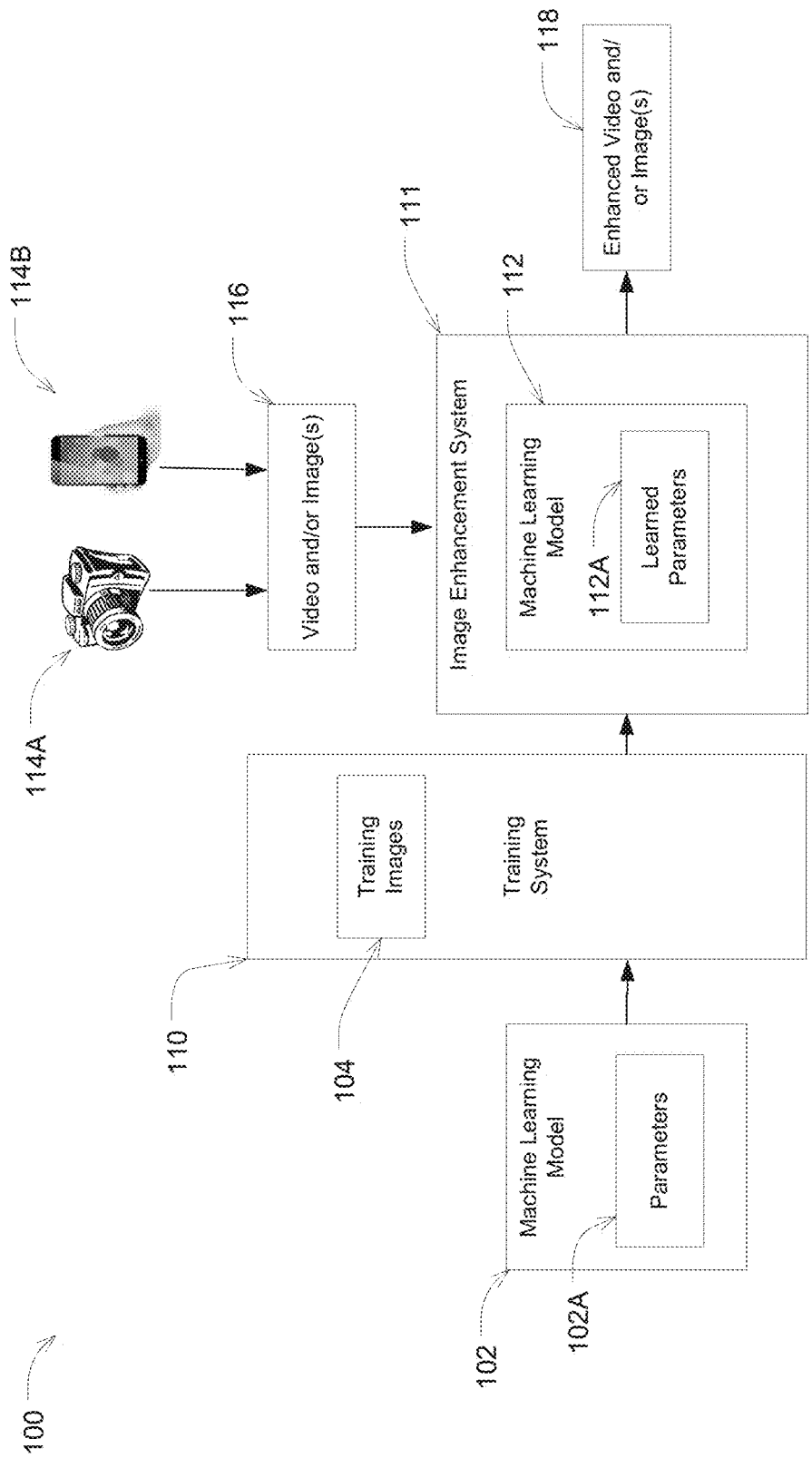
Figure 1B:
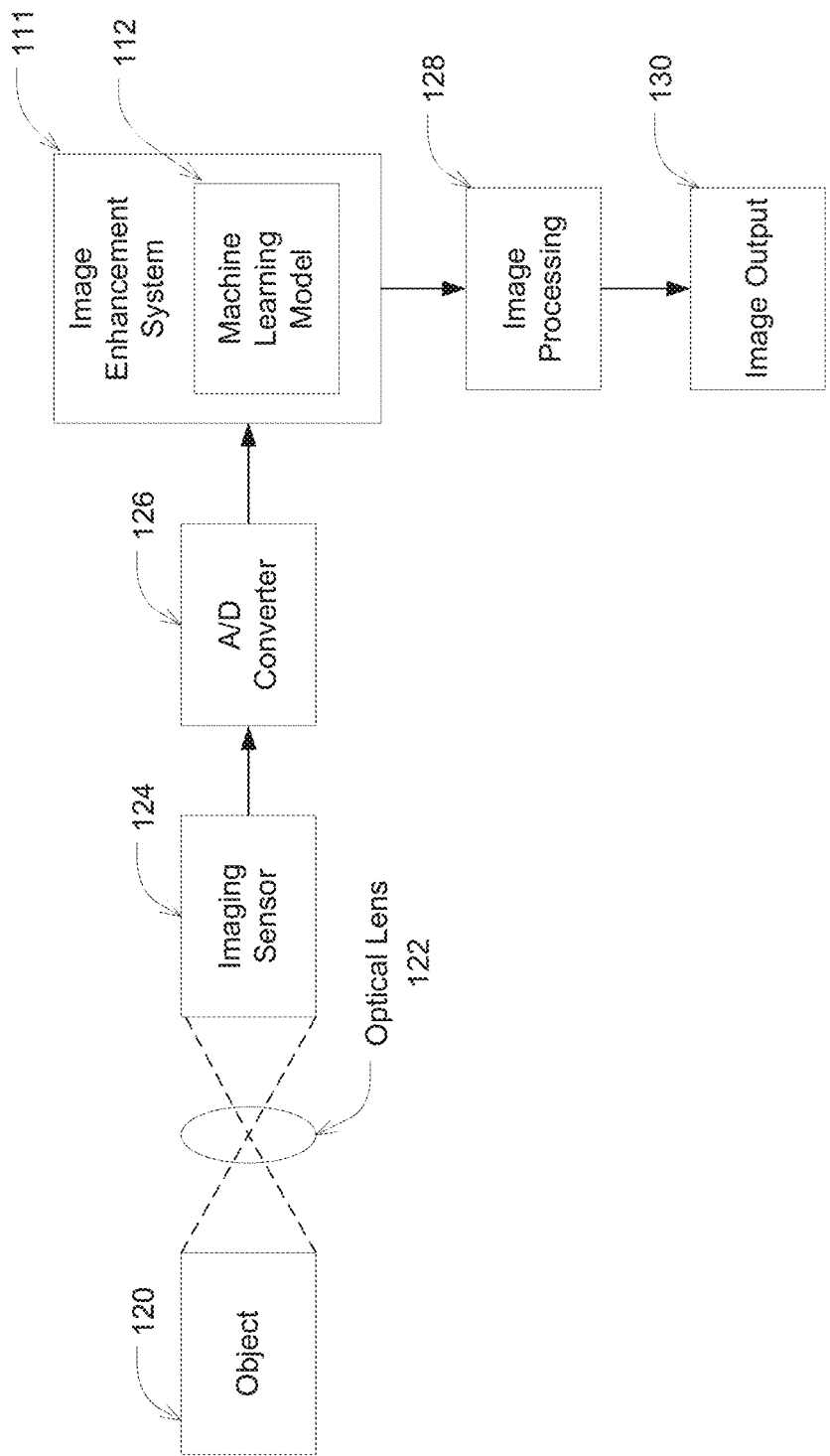

FIGS. 1A-B show systems in which aspects of the technology described herein may be implemented, in accordance with several embodiments of the invention.

Figure 2A:
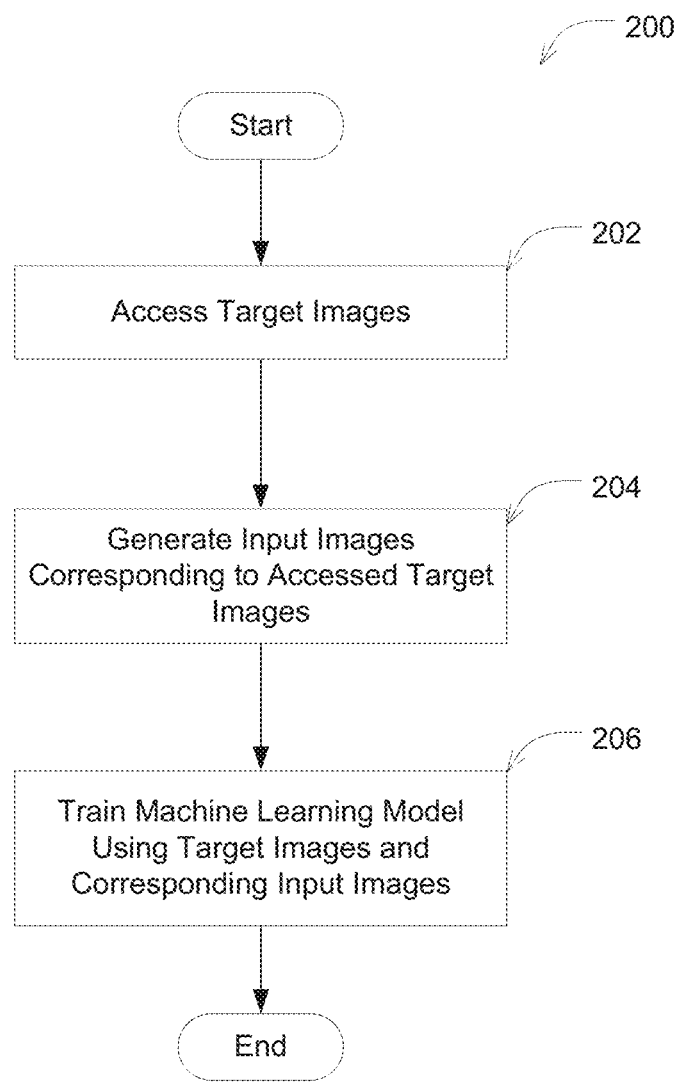

FIG. 2A shows a flowchart of an example process for training a machine learning model for image enhancement, according to some embodiments of the invention.

Figure 2B:
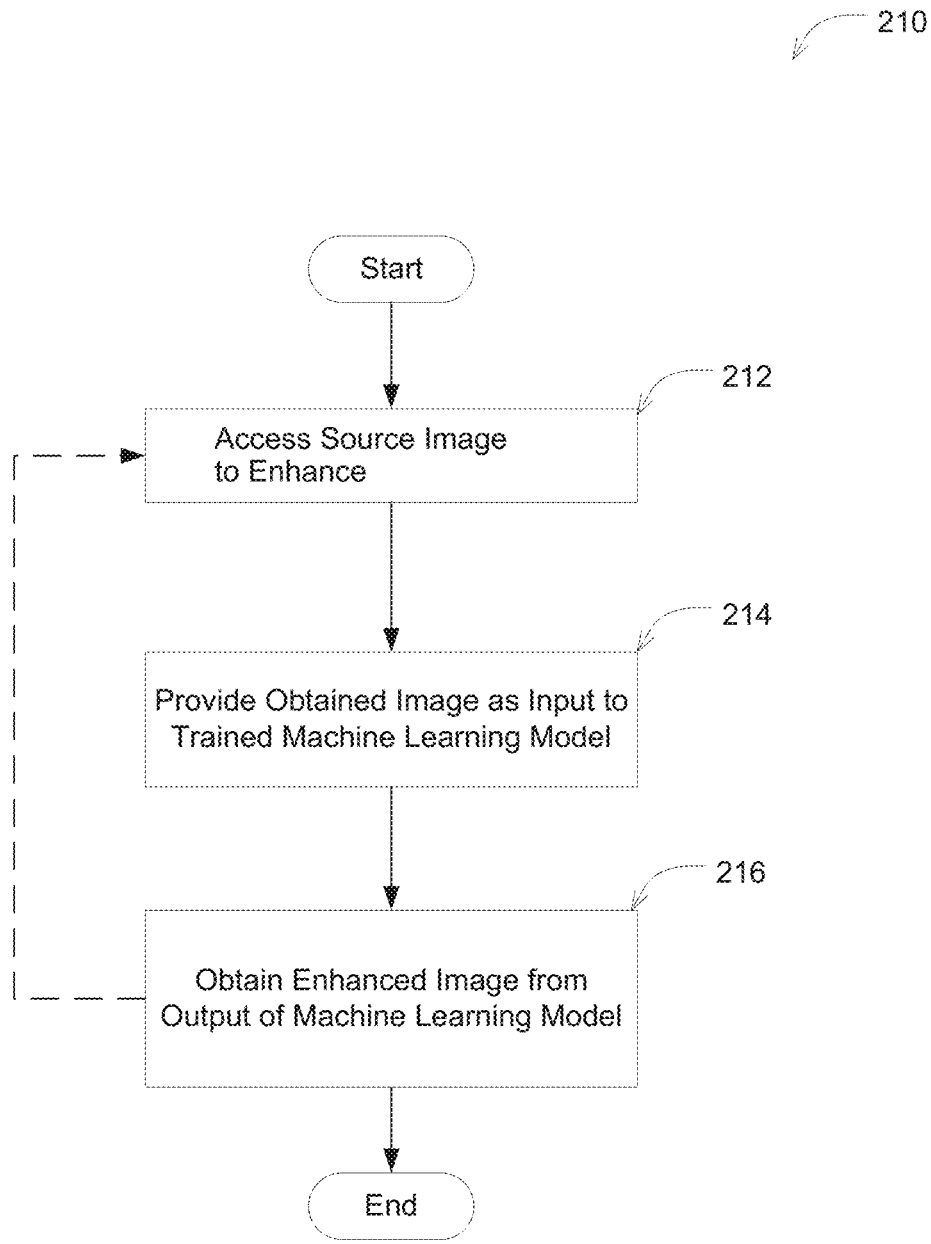

FIG. 2B shows a flowchart of an example process for using the machine learning model obtained by the process of FIG. 2A to enhance images, according to some embodiments of the invention.

Figure 3A:
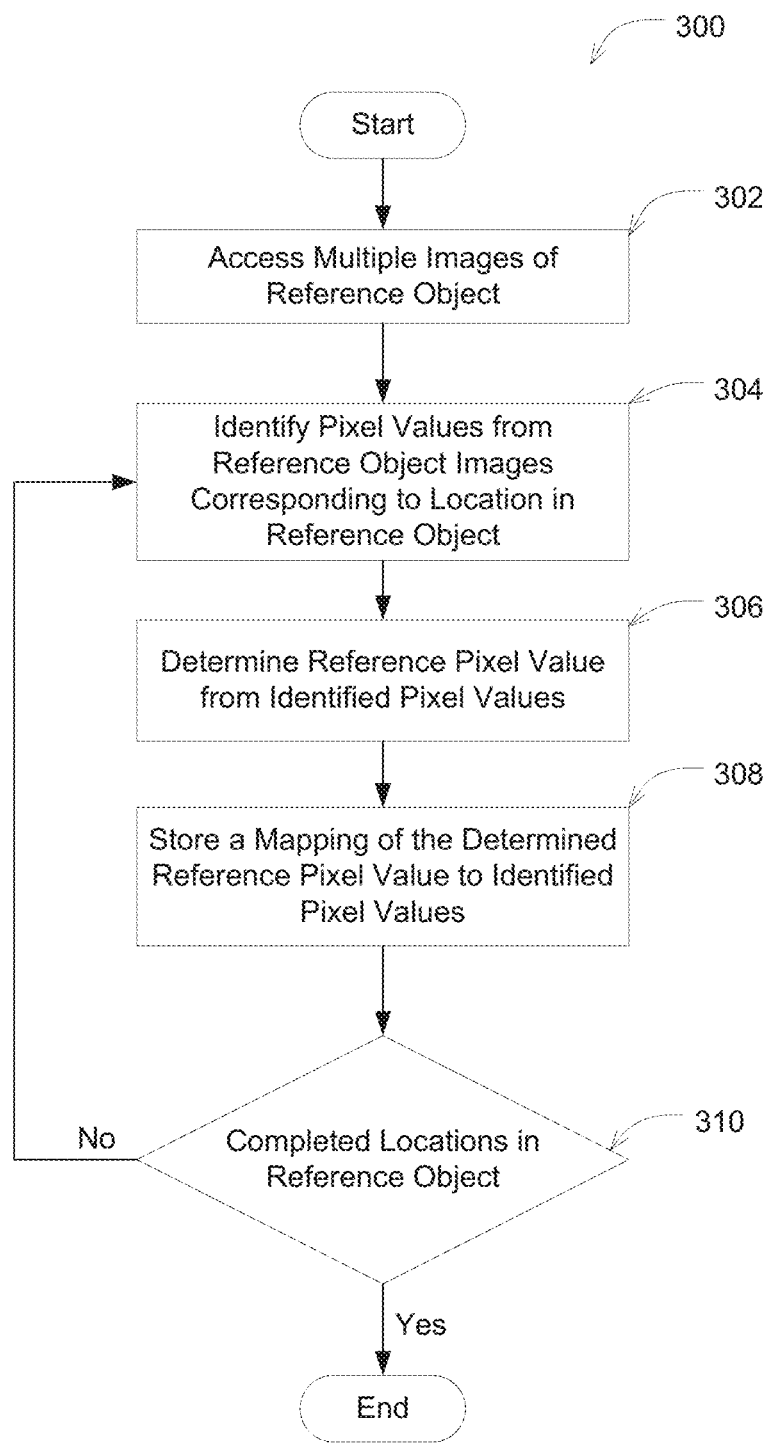

FIG. 3A shows a flowchart of an example process for generating reference pixel values and corresponding sets of pixel values for generating input images of training data, according to embodiments of the invention.

Figure 3B:
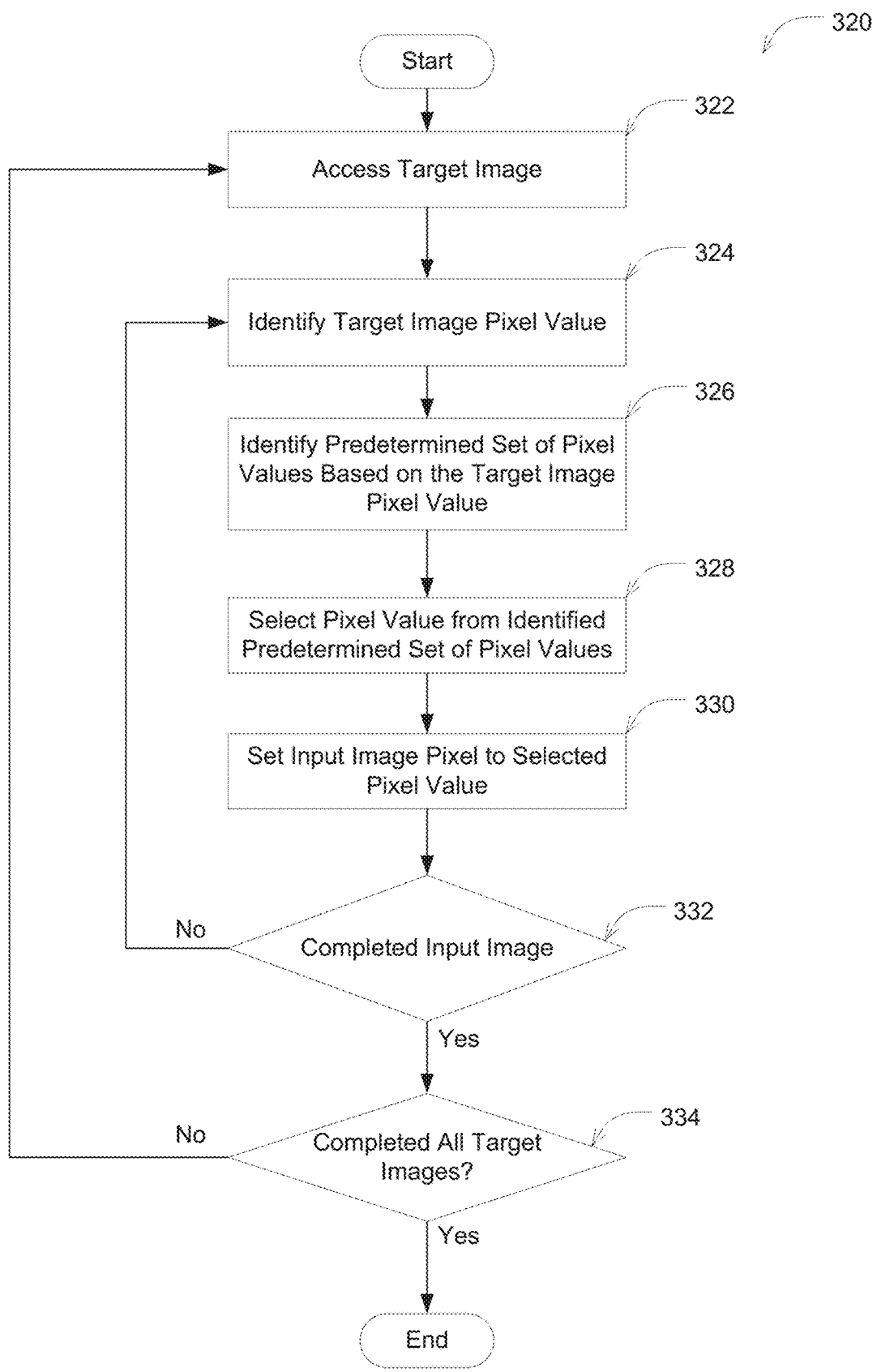

FIG. 3B shows a flowchart of an example process for generating input images corresponding to target images using the reference pixel values and corresponding sets of pixel values obtained by the process of FIG. 3A, according to some embodiments of the invention.

Figure 4A:
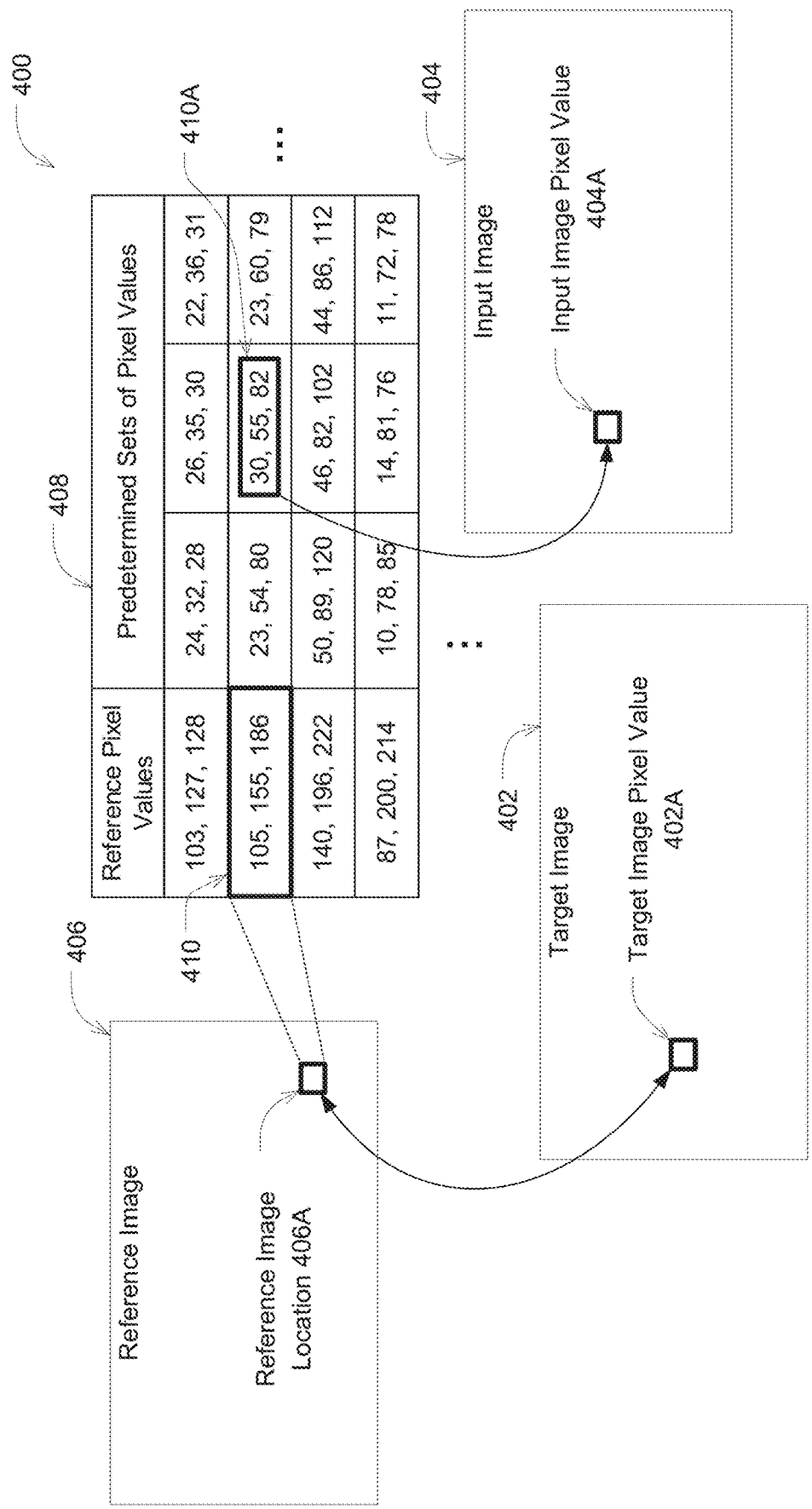

FIG. 4A illustrates an example of generating an input image for training a machine learning model, according to embodiments of the invention.

Figure 4B:
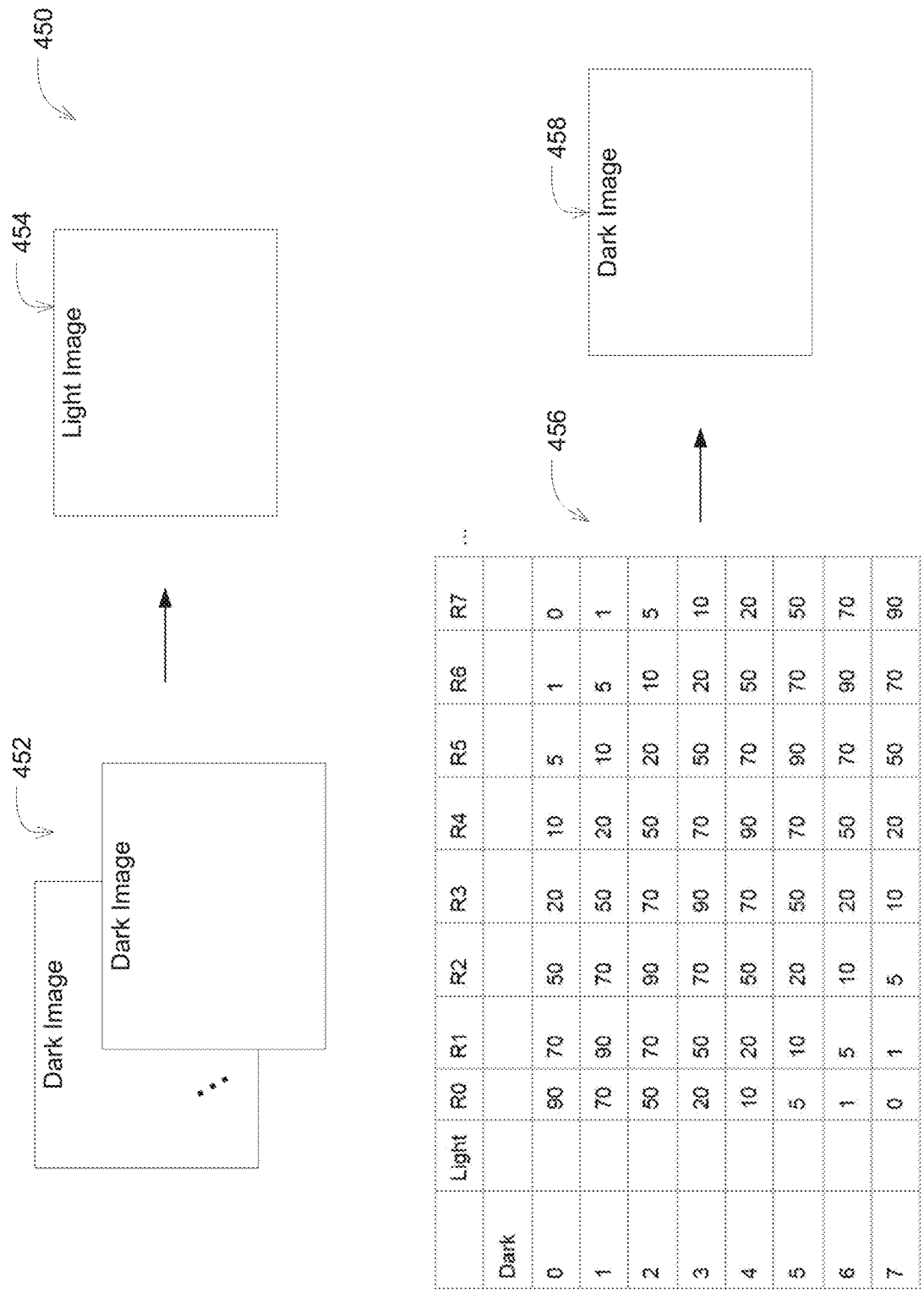

FIG. 4B illustrates another example of generating an input image for training a machine learning model, according to some embodiments of the invention.

Figure 5A:
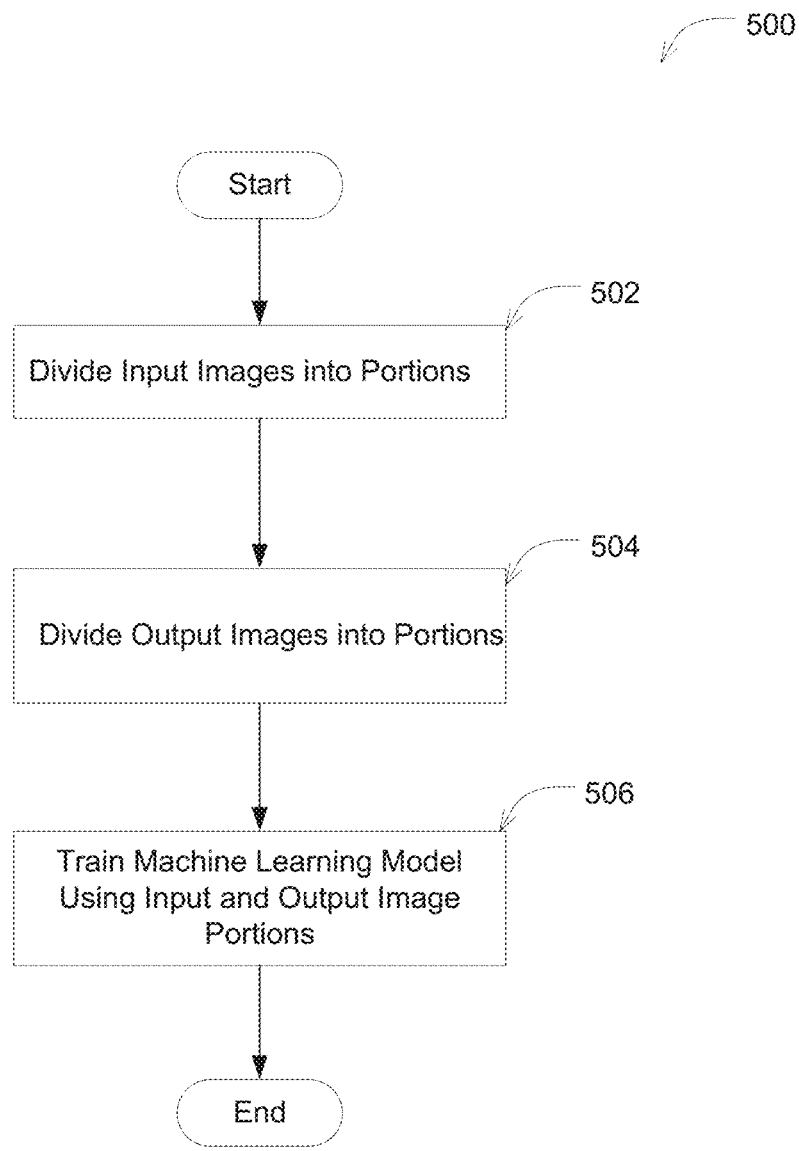

FIG. 5A shows a flowchart of an example process for training a machine learning model using portions of input and output images, according to some embodiments of the invention.

Figure 5B:
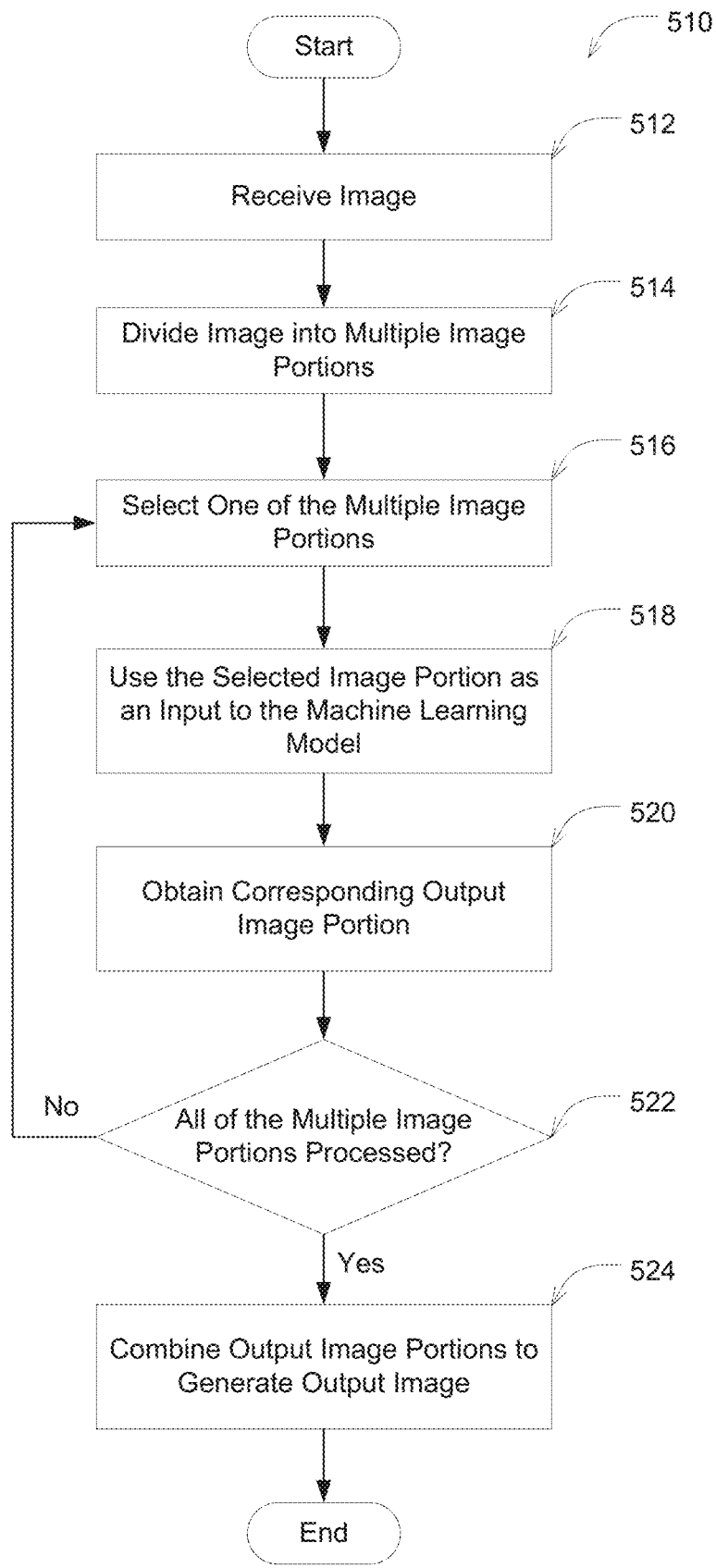

FIG. 5B shows a flowchart of an example process for enhancing an image by dividing the image into portions, according to several embodiments of the invention.

Figure 5C:
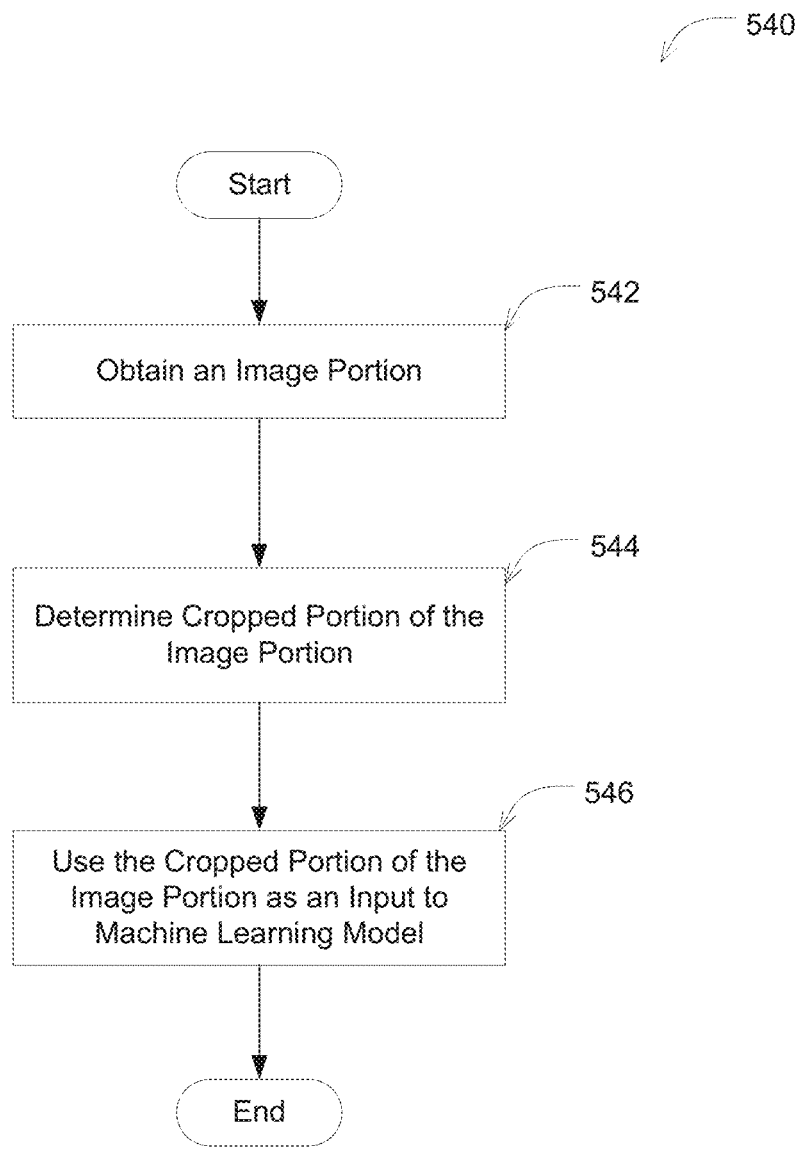

FIG. 5C shows a flowchart of an example process for mitigating edge distortion in filtering operations performed by a machine learning model, according to some embodiments of the invention.

Figure 5D:
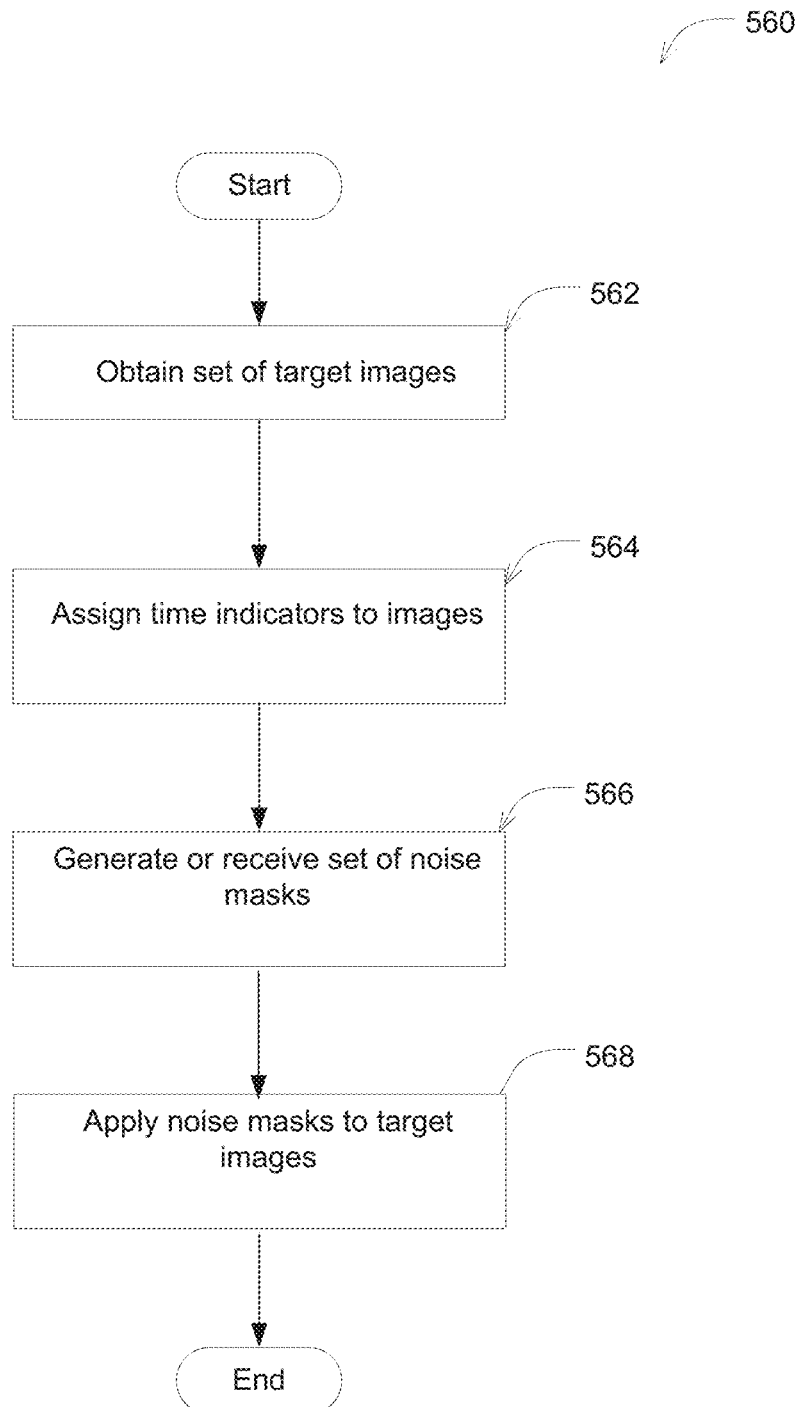

FIG. 5D illustrates a flow chart of a process for applying a sequence of simulated noise masks to a sequence of temporally-related target images in accordance with several embodiments of the invention.

Figure 5E:
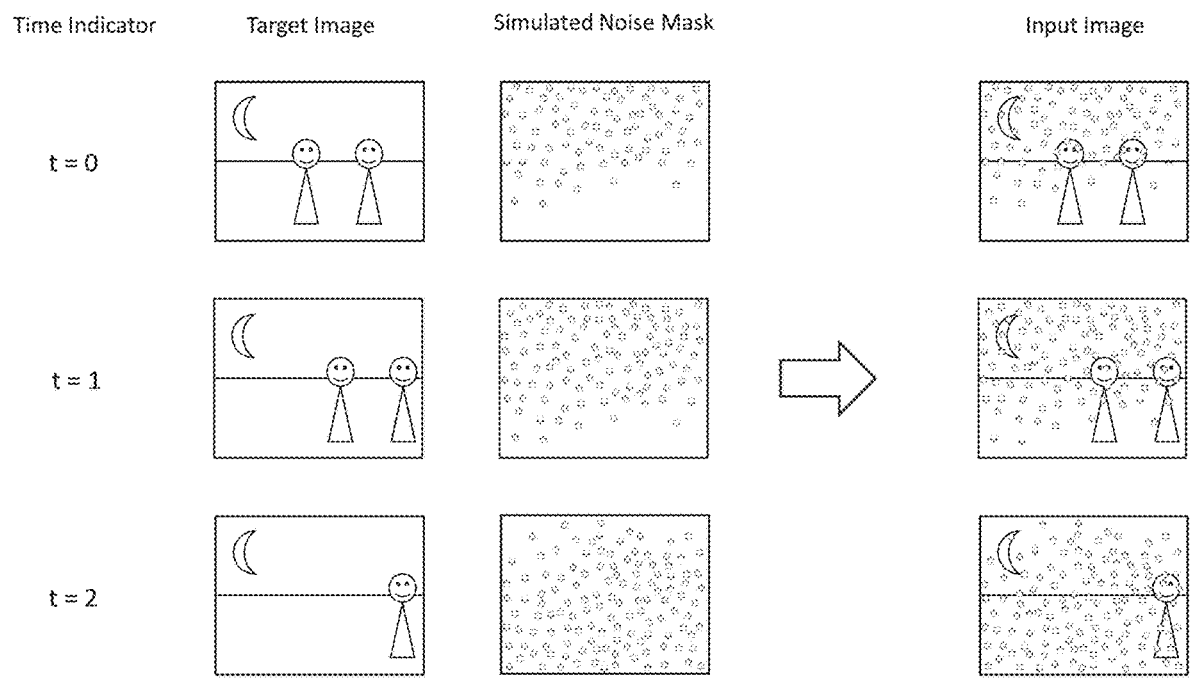

FIG. 5E illustrates how images may be modified by applying simulated noise masks to unperturbed (target) images in order to produced perturbed (input) images in accordance with several embodiments of the invention.

Figure 6:
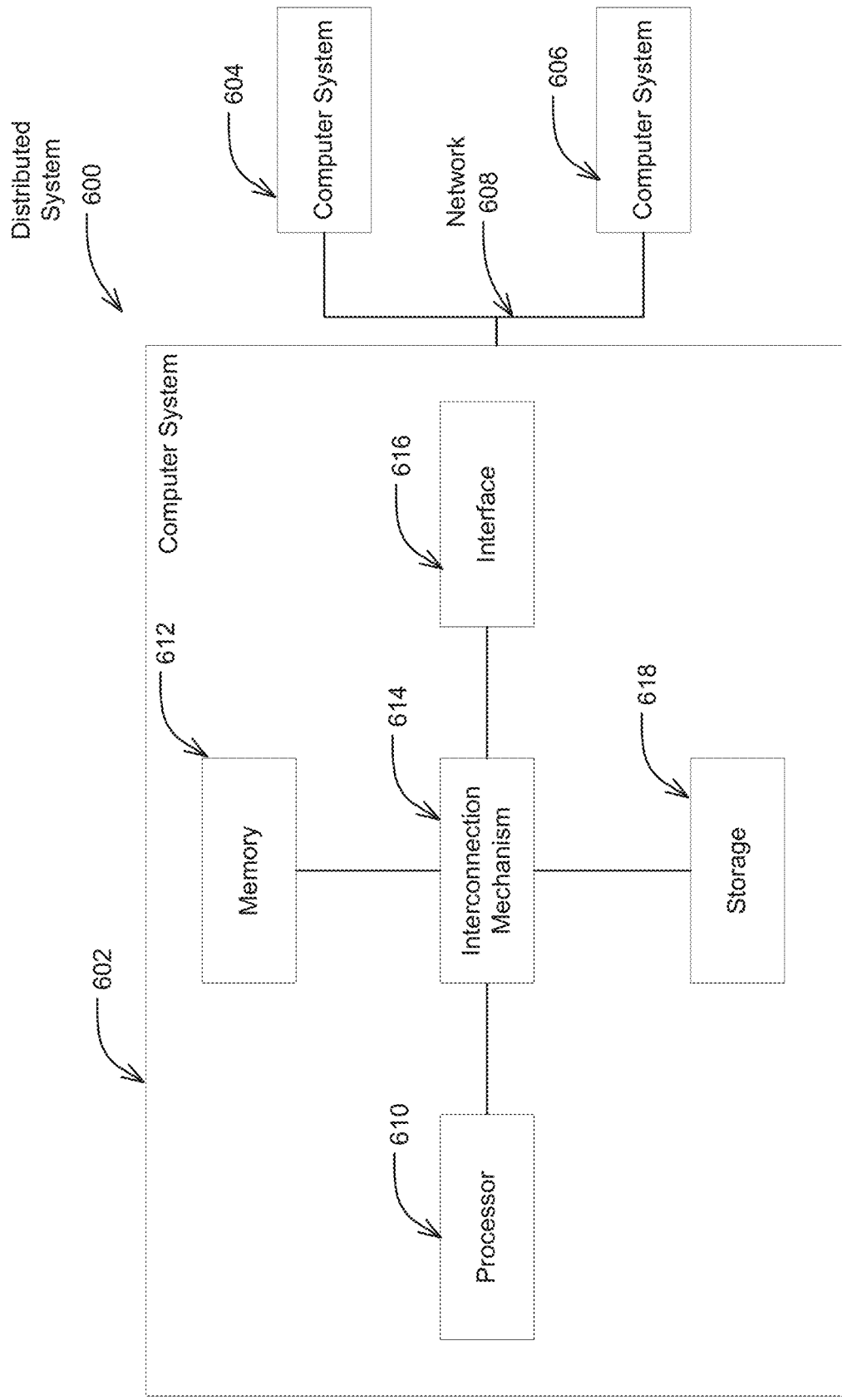

FIG. 6 is a block diagram of an illustrative computer system that may be used to implement some embodiments of the invention.

Figure 7:
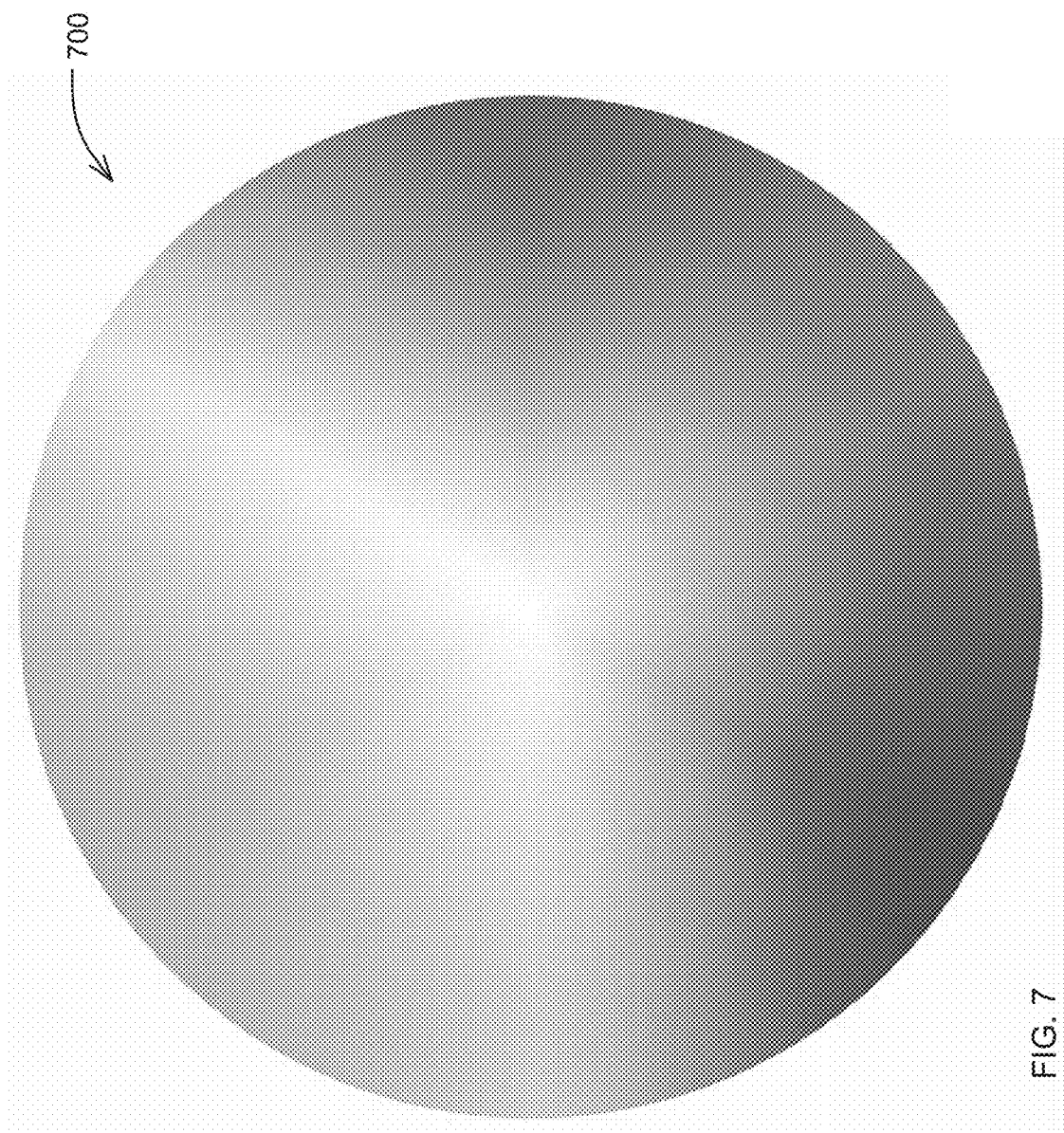

FIG. 7 is a diagram of an exemplary object with a rainbow of colors that span across the visible electromagnetic spectrum, according to some embodiments of the invention.

DETAILED DESCRIPTION

Turning now to the drawings, systems and methods for generating training input images to use in training a machine learning model for enhancing images are described. The techniques described here may be configured to generate a set of input images that each corresponds to a target output image (e.g., that was previously captured by an imaging device). The generated input images and corresponding target output images may form a set of training data for training a machine learning model for enhancing images. For example, techniques described herein may be used to generate sets of input images that simulate versions of noisy target images, such as images captured by an imaging device in low light. For ease of explanation, without intending to be limiting, the input images may also be referred to herein as "dark images," and the target images may be referred to herein as "bright images." Target images may represent aspects of target illuminated outputs that are to be generated by the machine learning model. It should be understood that the terms "dark images" and "bright images" are used herein for ease of explanation, but are not intended to only refer to brightness or to exclude characteristics of images that do not relate to brightness. For example, the techniques can be used to process noisy images to generate images with a better signal-to-noise ratio. Therefore, while some examples described herein refer to dark images and bright images, it should be appreciated that the techniques can be used to process various types of undesirable aspects of the input images, including noise, brightness, contrast, blurring, artifacts, and/or other noise artifacts. Thus, the input images processed using the techniques described herein can be any type of image with undesirable aspects, and the output images can represent the image with the undesirable aspects mitigated and/or removed (e.g., which can be generated using machine learning techniques, as described herein). An image may be a photograph. For example, an image may be a photograph captured by an imagine device (e.g., a digital camera). An image may also be a portion of a video. For example, an image may be one or more frames that make up a video.

A data set that includes sets of generated input images and corresponding target images may be used to train a machine learning model to illuminate images captured by the imaging device. For example, the machine learning model can be trained to generate a target bright image based on a corresponding dark image. The training process can therefore train the machine learning model to generate, based on a new dark image, output illumination (e.g., red, green, blue (RGB) values for each pixel, raw Bayer pattern values, thermal/infrared sensor data, and/or the like) that corresponds to a bright image based on illumination (e.g., RGB values for each pixel, raw Bayer pattern values, thermal/infrared sensor data, and/or the like) of the dark image.

In some embodiments, the system may access a target image (e.g., captured by a digital camera) representing a target output of a machine learning model. For example, the target image may be captured in well-lit conditions and/or conditions that result in low noise in the target image, and the target image may represent a target output for the machine learning model. The system may generate a corresponding input image by setting each pixel of the input image based on the target image by: (1) identifying a target image pixel value; (2) identifying a set of potential predetermined pixel values (e.g., dark image pixel values) based on the target image pixel value; (3) selecting a pixel value from the set of predetermined pixel values; and (4) setting the pixel in the input image to the selected pixel value. In some embodiments, the predetermined pixel values may simulate a distribution of pixel values that could be generated for a portion of a scene in the target image if captured in conditions that cause noise in the images, such as low light conditions. Thus the predetermined pixel values may be a distribution of "dark pixel values" that may be used to generate pixel values of a dark image corresponding to the target image. The system may train a machine learning model using the generated input images and target images (e.g., by applying a supervised learning algorithm to the input images and target images).

Imaging devices (e.g., digital cameras, image sensors, medical imaging devices, and/or electromagnetic field sensors) may perform poorly when capturing noisy images, such as images captured in low light. For example, a digital camera may have an image sensor that receives light waves via an optical lens, and converts the received light waves into electrical signals. The electrical signals are converted into one or more digital values (e.g., RGB channel values). The quality of images and/or video captured by the imaging device may be poor in conditions where there is a low amount of lighting. For example, in a digital camera, the image sensor may not be sensitive enough to capture enough information to distinguish one or more objects in the image when there is a low amount of light. Thus, low light may lead to images with poor contrast and/or blurred objects in the image.

Conventional solutions for capturing images in poor conditions may involve the use of imaging sensors that are specialized for performance in such poor conditions (e.g., specialized for low light conditions). Such sensors, however, may be larger than other imaging sensors. For example, a digital camera for a smartphone may be unable to incorporate such a specialized sensor into the smartphone because of size restrictions. The specialized sensor may also require more power and/or other resources, and thus reduce efficiency of a device (e.g., a smartphone). Furthermore, such specialized sensors are often significantly more expensive than imaging sensors that are not specialized for operation in low light. Other technical solutions often have narrow use cases that cannot be implemented across different applications. For example, the addition of an infrared or thermal sensor may be used to improve images captured in low light. This, however, often requires additional hardware and resources. Many devices (e.g., smartphones) may be unable to incorporate such solutions.

Machine learning techniques may be used to enhance images and/or video captured by an imaging device, often without requiring an addition or change in existing hardware of a device. For example, an image or video captured by a digital camera may be provided as input to a trained machine learning model to obtain an output of an enhanced version of the image or video. However, performance of a machine learning model in enhancing images captured by a device is often limited by the quality of training data (e.g., input images and/or corresponding target output images) used to train the machine learning model. A machine learning model trained using input images that more accurately represent images that potentially would be captured by a device in low light can provide better enhancement of images captured by the device (e.g., in low light).

Some conventional techniques for obtaining training data, which typically utilize a camera to capture both dark images (input images) and corresponding bright images (target images) of each scene, are both time consuming and limiting. For example, the dark image can be captured using a short exposure time (e.g., $1/15^{th}$ or $1/30^{th}$ of a second), while the bright image can be captured using a longer exposure time (e.g., 2 seconds, 5 seconds, etc.). When trying to capture large numbers of data points to use as training data, capturing images can be very time consuming. Furthermore, capturing bright images in this manner can be complicated by the fact that scenes with motion, which can be desirable for training purposes, may cause blur in the bright image. Moreover, capturing an identical scene with motion twice (once for dark images and once for bright images) can be physically and/or logistically difficult. Additionally, in order to capture a wide dataset with images of different scenes, which can also be desirable for training purposes, an operator needs to physically move the camera to each location and/or around at various imaging points at each location, which further limits the practicality in adequately gathering sufficient training data.

Accordingly, systems and methods in accordance with many embodiments of the invention utilize techniques for synthetically generating input images based on existing target images that accurately represent input images that would be captured by a device. The sets of target images and corresponding input images may be used to train a machine learning model for enhancing images captured by the device. For example, the techniques may generate input images of one or more scenes from target images of the scene(s) taken in well-lit conditions, where the input images simulate performance of the device in low light (e.g., represent dark images). In this example, the generated images of the scene(s) and target images may be used to perform supervised learning to train a machine learning model for enhancing images captured by the device.

The techniques can include developing a correspondence between dark illumination and bright illumination, which can be used to synthetically generate new dark images of existing bright images. In some embodiments, the techniques can include initially capturing (e.g., using a camera) a set of dark images. For example, a camera in a dark room can be configured to capture a series of images (e.g., one hundred, two hundred, a thousand, etc.) of an object (e.g., of a rainbow spectrum of all visible colors and/or of ranges of red, green, and/or blue, such as red, green, and blue color bars) at a same or similar shutter speed (e.g., $\frac{1}{15}^{th}$ of a second, $\frac{1}{30}^{th}$ of a second, etc.). While each dark image is of the same object at a same or similar shutter speed, the various images can capture variations that may be inherent to the image capture technology, such that each dark image may have slight variations among other dark images. The captured dark images can be used to generate a corresponding bright image, such as by averaging the dark images together and/or computing a linear combination (e.g., a mean) of the dark images.

The resulting generated bright image and corresponding set of captured dark images can be used to determine a correspondence between illumination data (e.g., RGB values, raw Bayer pattern values, thermal/infrared sensor data, and/or the like) in the bright image and illumination data (e.g., RGB values, raw Bayer pattern values, thermal/infrared sensor data, and/or the like) in the dark images. The correspondence between the dark and bright illumination data can be used to generate new dark images of existing bright images. For example, the illumination data in an existing bright image (e.g., with no corresponding dark image) can be used to generate a new corresponding dark image using the determined dark/bright illumination correspondence. In some embodiments, the illumination data to use to generate the dark image can be selected from the set of dark images by randomly selecting different illumination data from the set of dark images for each new dark image being generated by the system.

In some embodiments, the system may be trained to remove noise artifacts corrupting the input image, such as brightness, contrast, blurring, and/or the like. By removing noise artifacts that are corrupting the input image, the techniques can increase the signal-to-noise ratio of the image. For example, the techniques can increase the signal-to-noise ratio by, for example, approximately 2-20 dB.

Some embodiments of the invention described here address the above-described issues with conventional image enhancement systems. However, it should be appreciated that not every embodiment described herein addresses every one of these issues. It should also be appreciated that embodiments of the invention described herein may be used for purposes other than addressing the above-discussed issues in image enhancement.

Image Enhancement Systems

An image enhancement system in accordance with many embodiments of the invention include may include a machine learning model, interact with a training system, as well as receive captured source images for processing. FIG. 1A illustrates an example environment 100 that implements an image enhancement system in accordance with some embodiments of the invention. As shown in FIG. 1A, a machine learning model 102 includes a set of parameters 102A. In some embodiments, the machine learning model 102 may be a model configured to receive an input image (e.g., pixel values of the input image), and generate an enhanced output image. A training system 110 may train the machine learning model 102 to learn values of the parameters 102A using a set of training images 104. The training system 110 can provide a trained machine learning model 112 that is configured with learned parameter values 112A. The trained machine learning model 112 can be used by an image enhancement system 111 to enhance video and/or image(s) 116 captured by an imaging device such as a stand-alone digital camera 114A or a digital camera of a smart phone 114B. The image enhancement system 111 receives the video and/or image(s) 116 and outputs enhanced versions of the video and/or image(s) 118. In further embodiments of the invention, there may be a single machine learning model 112 that is trained rather than a model 102 that is trained to become another model 112.

In some embodiments, the training images 104 may include a set of input images and corresponding target images. The input images may be images that are to be enhanced, and the target images may be target outputs that the machine learning model 102 is to be trained to output. For example, the training system 110 may apply a supervised learning algorithm to the training images 104 to train the machine learning model 102. Example machine learning models and training algorithms are described further below.

In some embodiments, the machine learning model 102 may be a machine learning model for enhancing images that were captured in low light conditions. Images captured in low light conditions may be those in which a sufficient amount of light intensity was not present to capture one or more objects in an image, e.g., produce pixel values or other characteristics for the image where human vision cannot easily distinguish the one or more objects or where there is not enough contrast for the one or more objects to be perceptible. In some embodiments, an image captured in low light conditions may be an image captured with a light source of less than 50 lux. In some embodiments, an image captured in low light conditions may be an image captured with a light source of less than or equal to 1 lux. In some embodiments, an image captured in low light conditions may be an image captured with a light source of less than 2 lux, 3 lux, 4 lux, or 5 lux. The machine learning model 102 may be configured to receive an input video or image that was captured in low light settings, and generate a corresponding output video or image that displays objects as if they had been captured with a light source of greater intensity. Although specific values characterizing a low light condition are described above, one skilled in the art will recognize that any of a number of values may be utilized in accordance with embodiments of the invention as appropriate to a particular application. In addition, a low light condition may be defined in other ways, such as, but not limited to, a in a relative manner to a normal lighting condition or by an average or other combination of brightness or contrast values.

In some embodiments, the machine learning model 102 may include a neural network with one or more parameters 102A. The neural network may be made up of multiple layers, each of which has one or more nodes. The parameters 102A of the neural network may be coefficients, weights, filters, and/or other types of parameters used by nodes in layers of the neural network. A node may combine input data (e.g., values from a previous layer or pixel values from an image) using coefficients to generate an output value that is passed into an activation function of the node. The activation function may output a value that is passed to a subsequent layer of the neural network. The values generated by a final output layer of the neural network may be used to perform a task. In some embodiments, the final output layer of the neural network may be used to generate an enhanced version of an input image. For example, the values of the output layer may be used as inputs to a function for generating pixel values for an image that is to be output by the neural network. In some embodiments, the output layer of the neural network may include an enhanced version of the input image. For example, the output layer of the neural network may specify value pixels of an enhanced version of the input image.

In several embodiments, the machine learning model 102 may include a convolutional neural network (CNN). The CNN may include multiple layers. The parameters 102A may include filters that are applied at each layer of the CNN. Each layer of the CNN may be a set of one or more learnable filters with which an input to the layer is convolved. The results of the convolutions with each of the filter(s) can be used to generate an output of the layer. An output of a layer may then be passed to a subsequent layer for another set of convolution operations to be performed by one or more filters of the subsequent layer. In some embodiments, an output of a convolutional layer may be passed to a fully connected layer. In some embodiments, an output layer of the CNN may be used to generate an enhanced version of an input image. For example, the values of the output layer may be used as inputs to a function for generating pixel values for an image that is to be output by the neural network. In some embodiments, the output layer of the neural network may include an enhanced version of the input image. For example, the output layer of the CNN may specify a values for pixels of an enhanced image. In some embodiments, the convolutional neural network is a U-Net.

In some embodiments, the machine learning model 102 may include an artificial neural network (ANN). In some embodiments, the machine learning model 102 may include a recurrent neural network (RNN). In some embodiments, the machine learning model 102 may include a decision tree. In some embodiments, the machine learning model 102 may include a support vector machine (SVM). In some embodiments, the machine learning model may include genetic algorithms. Many embodiments of the invention are not limited to a particular type of machine learning model. In some embodiments, the machine learning model 102 may include a combination of one or more machine learning models. For example, the machine learning model 102 may include one or more neural networks, one or more decision trees, and/or one or more support vector machines. While certain types of machine learning models are discussed above, one skilled in the art will recognize that any of a variety of models may be utilized in accordance with embodiments of the invention as appropriate to a particular application.

In some embodiments, the training system 110 may be configured to obtain the training images 104. The training system 110 may obtain the training images 104 by: (1) accessing target images; and (2) for each target image, generating an input image corresponding to the target image. For example, the target images accessed by the training system 110 may be images of one or more scenes and/or frames of one or more videos. The training system 110 may generate an input image corresponding to each target image, where the input image represents a version of the target image that is to be enhanced. For example, the input image generated by the training system 110 may represent an image that would be captured by a device (e.g., device 114A or 114B) in low light conditions. The training system 110 may be configured to use the target images and corresponding input images as training data to train the machine learning model 110. Some techniques for training a machine learning model 102 in accordance with embodiments of the invention are described further below with reference to FIG. 2A.

In some embodiments, the training system 110 may be configured to generate an input image corresponding to a target image by generating an image of a target image scene that simulates an image that would be captured by an imaging device (e.g., device 114A or 114B) in low light conditions, referred to herein for discussion purposes as a "dark image." In other words, the input image may depict the content contained in target image but with the appearance as if it were captured in low light or less than ideal lighting conditions. In several embodiments, this may be seen by a lower overall or average brightness, contrast, luminance, or similar measure. In some embodiments, the training system 110 may be configured to generate the input image for the target image by: (1) determining a dark pixel value for each of the pixels in the target image, where the dark pixel value represents a respective portion of the scene in the target image that would have been captured by the imaging device in low light; and (2) setting a corresponding pixel in the input image to the determined dark pixel value. For example, a first target image pixel may have a first pixel value of [103, 127, 128] for respective RGB channels. In this example, the training system 110 may: (1) determine a dark pixel value for the first pixel value to be [24, 32, 28]; and (2) set a first input image pixel to the low light pixel value of [24, 32, 28]. In some embodiments, the training system 110 may be configured to determine a dark pixel value by selecting from a predetermined set of potential dark pixel values that correspond to a target image pixel value. Example techniques that be utilized for generating an input image corresponding to a target image in accordance with embodiments of the invention are described further below with reference to FIGS. 3A-B, and FIG. 4A-4B.

A trained machine learning model 112 may be obtained, for example, as a result of training a machine learning model 102 using training system 110. The trained machine learning model 112 may have learned parameters 112A for performing image enhancement based on the training images 104. The learned parameters 112A may include values such as, but not limited to, values of hyper-parameters of the machine learning model, values of coefficients or weights of the machine learning model, and/or values of other parameters of the machine learning model. In some embodiments, the image enhancement system 111 can use the trained machine learning model 112 to perform image enhancement of video and/or image(s) 116 received from an imaging device. For example, the imaging device(s) may be a stand-alone digital camera 114A, or a digital camera or imager component of a smart phone 114B. Some embodiments are not limited to any particular type of imaging device.

The image enhancement system 111 can use the received image(s) 116 to generate inputs to the trained machine learning model 112. In some embodiments, the image enhancement system 111 may be configured to use pixel values of the image(s) 116 as inputs to the machine learning model 112 (e.g., neural network(s) and/or other model(s)). In some embodiments, the image enhancement system 111 may be configured to divide the image(s) 116 into portions, and feed pixel values of each portion separately into the machine learning model 112 as inputs. In some embodiments, a pixel value may include values for one or more channels. For example, an image may have a value for a red channel, green channel, and blue channel. These color channels may also be referred to herein as "RGB channels." As another example, a pixel value may have a single value (e.g., grayscale value).

After enhancing the received video and/or image(s) 116, the image enhancement system 111 may output the enhanced video and/or image(s) 118. In some embodiments, the enhanced video and/or image(s) 118 may be output to a device from which the image(s) 116 were received. For example, the enhanced video and/or image(s) 118 may be output to mobile device 114B from which the video and/or image(s) 116 were received. The mobile device 114B may display the enhanced video and/or image(s) 118 on a display of the device 114B, load the enhanced video and/or image(s) 118 into an editing program, and/or store the enhanced video and/or image(s) 118. In some embodiments, the image enhancement system 111 may be configured to use the enhanced image(s) 118 for subsequent evaluation of performance of the image enhancement system 111 and/or retraining of the machine learning model 112.

In some embodiments, the image enhancement system 111 may be deployed on a device from which the video and/or image(s) 116 were received. For example, the image enhancement system 111 may be part of an application installed on the mobile device 114B that, when executed by the mobile device 114B, performs enhancement of the received video and/or image(s) 116. In some embodiments, the image enhancement system 111 may be implemented on one or more separate computers. The image enhancement system 111 may receive the video and/or image(s) 116 via a communication interface. The communication interface may be a wired or wireless network connection or a wired data connection. For example, the image enhancement system 111 may be implemented on a server. The server may receive the video and/or image(s) 116 via a network (e.g., via the Internet). In another example, the image enhancement system 111 may be a desktop computer that receives the video and/or image(s) 116 via a wired connection (e.g., USB) from one or more of the devices 114A-B. Some embodiments are not limited by how the image enhancement system 111 obtains the video and/or image(s) 116.

FIG. 1B illustrates components of an image enhancement system 111 for performing image enhancement of an image captured by an imaging device (e.g., imaging device 114A or 114B) in accordance with several embodiments of the invention. Light waves from an object 120 pass through an optical lens 122 of the imaging device and reach an imaging sensor 124. The imaging sensor 124 receives light waves from the optical lens 122, and generates corresponding electrical signals based on intensity of the received light waves. The electrical signals are then transmitted to an analog to digital (A/D) converter that generates digital values (e.g., numerical RGB pixel values) representing an image of the object 120 based on the electrical signals.

The image enhancement system 111 receives the captured image and uses the trained machine learning model 112 to enhance the image. In many embodiments of the invention, the machine learning model 112 is one that is trained using target images and input images generated from target images as discussed further above. For example, if the image of the object 120 was captured in low light conditions in which objects are blurred and/or there is poor contrast, the image enhancement system 111 may de-blur the objects and/or improve contrast. The image enhancement system 111 may further improve brightness of the images while making the objects more clearly discernible to the human eye. In several embodiments of the invention, the image enhancement system 111 may output the enhanced image for further image processing 128. For example, the imaging device may perform further processing on the image (e.g., adjusting characteristics such as brightness, white balance, sharpness, and/or contrast). Other embodiments do not include image processing 128. The image may then be output 130. For example, the image may be output to a display of the imaging device (e.g., display of a mobile device), and/or be stored by the imaging device.

In some embodiments, the image enhancement system 111 may be configured for operation with a specific type of imaging sensor 124. For example, the machine learning model 112 may be trained (e.g., by training system 110) using target images obtained using an imaging sensor that is the same type as imaging sensor 124. Thus, the machine learning model 112 may have learned parameters 112A trained for the type of imaging sensor 124. In some embodiments, the image enhancement system 111 may be configured to perform enhancement on raw values received from the imaging sensor 124 before further image processing 128 is performed on an image. By performing image enhancement on raw values received from the imaging sensor 124 before further image processing 128, the machine learning model 112 may be trained for characteristics (e.g., inherent or physical) of the imaging sensor 124 of the device. For example, the imaging sensor 124 may be a complementary metal-oxide semiconductor (CMOS) silicon sensor that captures light. The sensor 124 may have multiple pixels which convert incident light photons into electrons, which in turn generates an electrical signal is fed into the A/D converter 126. In another example, the imaging sensor 124 may be a charge-coupled device (CCD) sensor. Although specific types of sensors are discussed above, one skilled in the will recognize that any of a variety of types of sensors may be utilized in accordance with embodiments of the invention as appropriate to a particular application.

In some embodiments of the invention, the machine learning model 112 may be trained based on training images captured using a particular type of imaging sensor model. Image processing 128 performed by an imaging device may differ between users based on particular configurations and/or settings of the device. For example, different users may have the imaging device settings set differently based on preference and use. The image enhancement system 111 may perform enhancement on raw values received from the A/D converter to eliminate variations resulting from image processing 120 performed by the imaging device.

In some embodiments of the invention, the image enhancement system 111 may be configured to convert a format of numerical pixel values received from the A/D converter 126. For example, the values may be integer values, and the image enhancement system 111 may be configured to convert the pixel values into float values. In some embodiments, the image enhancement system 111 may be configured to subtract a black level from each pixel. The black level may be values of pixels of an image captured by the imaging device that show no color. Accordingly, the image enhancement system 111 may be configured to subtract a threshold value from pixels of the received image. In some embodiments, the image enhancement system 111 may be configured to subtract a constant value from each pixel to reduce sensor noise in the image. For example, the image enhancement system 111 may subtract a number such as, but not limited to, 60, 61, 62, or 63 from each pixel of the image.

In some embodiments of the invention, the image enhancement system 111 may be configured to normalize pixel values. In some embodiments, the image enhancement system 111 may be configured to divide the pixel values by a certain value to normalize the pixel values. In some embodiments, the image enhancement system 111 may be configured to divide each pixel value by a difference between the maximum possible pixel value and the pixel value corresponding to a black level (e.g., 60, 61, 62, or 63). In some embodiments, the image enhancement system 111 may be configured to divide each pixel value by a maximum pixel value in the captured image, and a minimum pixel value in the captured image.

In some embodiments of the invention, the image enhancement system 111 may be configured to perform demosaicing to the received image. The image enhancement system 111 may perform demosaicing to construct a color image based on the pixel values received from the A/D converter 126. The system 111 may be configured to generate values of multiple channels for each pixel. In some embodiments, the system 111 may be configured to generate values of four color channels. For example, the system 111 may generate values for a red channel, two green channels, and a blue channel (RGGB). In some embodiments, the system 111 may be configured to generate values of three color channels for each pixel. For example, the system 111 may generate values for a red channel, green channel, and blue channel (RGB). While specific color channels are discussed here, one skilled in the art will recognize that any of a variety of color channel arrangements may be utilized in accordance with embodiments of the invention as appropriate to a particular application.

In some embodiments of the invention, the image enhancement system 111 may be configured to divide the image into multiple image portions. The image enhancement system 111 may be configured to enhance each image portion separately, and then combine enhanced versions of each image portion into an output enhanced image. The image enhancement system 111 may generate an input to the machine learning system 112 for each of the image portions as received inputs. For example, the image may have a size of 500×500 pixels and the system 111 may divide the image into 100×100 pixel portions. The system 111 may then input each 100×100 portion into the machine learning system 112 and obtain a corresponding output. The system 111 may then combine all the outputs corresponding to each 100×100 portion to generate a final image output. In some embodiments, the system 111 may be configured to generate an output image that is the same size as the input image. While specific sizes of images and image portions are described here, one skilled in the art will recognize that any of a variety of sizes may be utilized in accordance with embodiments of the invention as appropriate to a particular application.

While specific systems including image enhancement systems are illustrated in FIGS. 1A and 1B and described above, one skilled in the art will recognize that many variations of systems are possible in accordance with different embodiments of the invention. One skilled in the art will recognize that aspects and/or types of certain components discussed above may vary as appropriate to a particular application.

Processes for Training Machine Learning Models Using Generated Input Images

Processes for training machine learning models for image enhancement may utilize image enhancement systems as described further above. FIG. 2A illustrates a flow chart of a process 200 for training a machine learning model, in accordance with several embodiments of the invention. Process 200 may be performed by any suitable computing device or system including multiple computing device. For example, process 200 may be performed by training system 110 to train machine learning model 102 to obtained the trained machine learning model 112 as described above with reference to FIGS. 1A-B.

In some embodiments, the machine learning model may be a deep learning model. In some embodiments, the deep learning model may be a neural network. The machine learning model may be a CNN or an RNN that outputs pixel values of an enhanced image. In some embodiments, the machine learning model may be a support vector machine, a linear regression model, a decision tree model, a Naïve Bayes classifier. Some embodiments are not limited to a particular machine learning model.

The process 200 includes accessing (202) target images (e.g., of one or more scenes). In some embodiments, the system may be configured to access images captured by an imaging device (e.g., an imaging sensor). In several embodiments, the imaging device is one for which the machine learning model is to be trained. The target images may represent target enhanced output images that are to be output by the trained machine learning model.

Some embodiments also include capturing the image(s) using the imaging device. As an example, the imaging device may capture the target images by: (1) capturing images of one or more scenes with a threshold amount of lighting (e.g., with a light source of at least 200 lux); and (2) using the captured images as the target images. As another example, the imaging device may capture the target images by: (1) capturing one or more videos of one or more scenes with a threshold amount of lighting (e.g., with a light source of at least 200 lux); and (2) using the frames of the captured video(s) as the target images. Videos may be understood as sequences of frames where each frame represents an image. Although a specific threshold of lighting is provided above, one skilled in the art will recognize that different thresholds may be utilized in accordance with different embodiments of the invention as may be appropriate for a particular application.

In some embodiments, the system may be configured to access target images such that the machine learning model may be trained to improve accuracy of images captured by a particular image capture technology (e.g., camera model or imaging sensor model). The machine learning model may be trained for an error profile of the image capture technology such that the machine learning model may be optimized to correct errors characteristic of the image capture technology. In some embodiments, the system may be configured to access data obtained from a type of imaging sensor. As an example, the system may access target images captured by a particular model of a CMOS imaging sensor. In some embodiments, the system may be configured to access training images captured by a particular camera model. As an example, the system may access target images captured by a Canon EOS Rebel T7i EF-S 18-135 camera. Although particular types of image capture technology are described here, one skilled in the art will recognize that any of a variety of types may be utilized in accordance with embodiments of the invention as may be appropriate for a particular application.

The process 200 includes generating (204) input images corresponding to the target images that were accessed, obtained, or captured. In some embodiments, the system may be configured to generate input images that correspond to the target images by generating a dark image for each target image. A dark image generated by the system for a respective target image may represent a version of the target image as it would be captured in low light (e.g., with a light source of less than 50 lux). In some embodiments, the system may be configured to determine an input image corresponding to a target image by determining a pixel value at a pixel in the input image ("input image pixel value") using a corresponding pixel value at a pixel in the target image ("target image pixel value"). To illustrate, for a 1000×1000 pixel target image that was accessed (202), the system may generate a corresponding 1000×1000 pixel input image having input image pixel values using target image pixel values. As an example, the system may determine the pixel value at input image pixel (1, 1) using a pixel value at target image pixel (1, 1). As another example, the system may determine the pixel value at input image pixel (500, 500) of the input image using a pixel value at target image pixel (500, 500). Although specific images sizes and pixel values may be discussed above, one skilled in the art will recognize that any of a variety of sizes and/or values may be utilized in accordance with embodiments of the invention.

In some embodiments, the system may be configured to determine an input image pixel value using a corresponding target image pixel value by selecting one of a predetermined set of pixel values. The system may be configured to access a mapping of reference pixel values to respective predetermined sets of pixel values (such as those generated from process 300 described further below with reference to FIG. 3A). In some embodiments, the predetermined set of pixel values may be a set of dark pixel values that correspond to a respective reference pixel value. The reference image pixel value may indicate a particular color (e.g., in the visible electromagnetic spectrum of colors). The set of dark pixel values corresponding to the reference image pixel value may represent pixel values that would be generated (e.g., by a particular image capture technology) when an image including the color is captured in low light conditions. In some embodiments, the predetermined set of dark pixel values corresponding to the target image pixel value may be determined by: (1) capturing multiple images of a reference object including the color indicated by the target image pixel value in low light, or simulated low light; and (2) storing pixel values of the multiple images at pixels corresponding to the location of the color in the reference object as the predetermined set of dark pixel values. An example process for obtaining predetermined sets of pixel values for one or more target image pixel values in accordance with embodiments of the invention is described further below with reference to FIG. 3A.

In some embodiments, the system may be configured to generate an input image corresponding to a portion of a target image. For example, for a 1000×1000 pixel target image that was accessed (202), the system may generate a corresponding 800×800 pixel input image. In some embodiments, the system may select a portion of the target image for which to generate the input image. For example, the system may crop a portion of the target image, and use pixel values of the cropped portion to generate the input image. In some embodiments, the system may be configured to select a portion of the target image based on pixel values. For example, the system may select pixels in the target image having pixel values that exceed a threshold pixel value (e.g., a threshold magnitude).

Process 200 includes training (206) a machine learning model using at least the target images that were accessed (202) and the input images that were generated (204). In some embodiments, the system may be configured to: (1) use the input images generated (204) as inputs of a training data set; (2) use the target images accessed (202) as target outputs of the training data set; and (3) apply a supervised learning algorithm to the training data set. A target image corresponding to a respective input image may represent a target enhanced version of the input image that the trained machine learning model is designed to output.

In some embodiments, the system may be configured to perform supervised training using the training data set (e.g., input images and target images). In some embodiments, the system may be configured to train the machine learning model by: (1) providing the input images to the machine learning model to obtain corresponding output images; and (2) training the machine learning model based on a difference between the output images generated using the machine learning model and the target images. A target image may be a target enhanced output for a respective input image. The difference may provide a measure of how well the machine learning model performs in enhancing an input image. As an example, the parameters of the machine learning model may be updated using stochastic gradient descent and/or any other iterative optimization technique suitable for training the model. As an example, the system may be configured to update one or more parameters of the model based on the determined difference.

In some embodiments, the system may be configured to train the machine learning model by using stochastic gradient descent. The system may make changes to parameters of the machine learning model iteratively to optimize an objective function to obtain a trained machine learning model. For example, the system may use stochastic gradient descent to train filters of a convolutional network and/or weights of a neural network. Although specific techniques for updating and/or optimizing a machine learning model are discussed here, one skilled in the art will recognize that any of a variety of techniques may be utilized in accordance with embodiments of the invention as appropriate to a particular application.

In some embodiments, the system may be configured to store the trained machine learning model after training (206). The system may store value(s) of one or more trained parameters of the machine learning model. As an example, the machine learning model may include one or more neural networks and the system may store values of trained weights of the neural network(s). As another example, the machine learning model may include a convolutional neural network and the system may store one or more trained filters of the convolutional neural network. In some embodiments, the system may be configured to store the trained machine learning model (e.g., in image enhancement system 111) for use in enhancing images (e.g., captured in low light conditions by an imaging device).

In some embodiments, the system may be configured to obtain new data to update the machine learning model using new training data. In some embodiments, the system may be configured to update the machine learning model by training a new machine learning model using the new training data. As an example, the system may train a new machine learning model using the new training data. In some embodiments, the system may be configured to update the machine learning model by retraining the machine learning model using the new training data to update one or more parameters of the machine learning model. As an example, the output(s) generated by the model and corresponding input data may be used as training data along with previously obtained training data. In some embodiments, the system may be configured to iteratively update the trained machine learning model using input images and corresponding enhanced output images (e.g., obtained from performing process 210 described below in reference to FIG. 2B). As an example, the system may be configured to provide an input image to a first trained machine learning model (e.g., a teacher model), and obtain an output enhanced image. The system may then retrain the machine learning model using the input image and the corresponding output image to obtain a second trained machine learning model (e.g., a student model).

In some embodiments, the system may be configured to train a separate machine learning model for each of multiple image capture technologies (e.g., imaging sensor model or camera model). A machine learning model may be trained for a respective image capture technology (or a specific imaging device) using target images obtained from an imaging device of that image capture technology. The machine learning model may be tuned for characteristics of the image capture technology. In some embodiments, the system may be configured to train a generalized machine learning model that is to be used for multiple image capture technologies. The generalized machine learning model may be trained using target images aggregated from multiple imaging technologies.

FIG. 2B illustrates an example process 210 for using a trained machine learning model obtained from process 200 for enhancing an image, in accordance with several embodiments of the invention. Process 210 may be performed by any suitable computing device or system of computing devices. As an example, process 210 may be performed by an image enhancement system 111 described with reference to FIGS. 1A-B.

Process 210 includes accessing (212) a source image to enhance. In some embodiments, the system may be configured to access an image captured by an imaging device (e.g., a digital camera or an imaging sensor thereof). For example, the system may access an image captured when the imaging device is used to capture a photo of a scene. As another example, the system may access a frame of a video when the imaging device is used to capture a video. In some embodiments, the system may be configured to access the image before the device applies image processing to the captured image (e.g., as described above with reference to FIG. 1B). In some embodiments, the system may include an application installed on a device (e.g., a smartphone) that accesses images captured by the device (e.g., by a digital camera or other imaging device component of the smartphone). The application may access an image before the captured image is displayed to a user.

The process 210 includes providing (214) the image accessed (212) to a trained machine learning model. For example, the system may provide the image accessed (212) to a machine learning model trained using process such as process 200 discussed further above with reference to FIG. 2. In some embodiments, the system may be configured to provide the image as input to the machine learning model by providing image pixel values as input to the machine learning model. For example, the image may be a 1000×1000 pixel image. The system may provide pixel values at each of the pixels as input to the machine learning model. In some embodiments, the system may be configured to flatten an image into a set of pixel values. For example, the system may: (1) flatten a 500×500 pixel image into a 250,000×1 array of pixel values; and (2) provide the array as input to the machine learning model. To illustrate, the machine learning model (e.g., a CNN) may have multiple inputs. The system may be configured to provide pixel values from the image as the multiple inputs.

In some embodiments, the system may be configured to provide an image as input to a machine learning model by: (1) dividing the image into multiple portions; and (2) providing each portion as input to the machine learning model. For example, the system may provide pixel values of each of the portions of the image as input to the machine learning model. The system may input pixel values of a portion of the image as an array to the machine learning model.

In some embodiments, the system may be configured to obtain an enhanced output image corresponding to a source image provided to the machine learning model. In some embodiments, the system may be configured to obtain the enhanced output image by: (1) obtaining multiple pixel values in response to providing pixel values of a source image to be enhanced to the machine learning model; and (2) generating the enhanced image from the obtained pixel values. For example, the machine learning model may be a CNN in accordance with some embodiments of the invention. In this example, the pixel values may be provided as inputs to a first convolutional layer of the CNN.

The process 210 includes obtaining (216) an enhanced image from the output of the machine learning model. In some embodiments, the system may be configured to obtain, from the machine learning model, pixel values of an enhanced image. For example, the machine learning model may output a 250,000×1 array of pixel values that specify pixel values at pixels of a 500×500 output image. In some embodiments, the system may be configured to: (1) obtain, from the machine learning model, enhanced versions of multiple portions of the input image; and (2) combine the enhanced image portions to generate the enhanced image. An example process for providing image portions as input to a machine learning model, and combining outputs corresponding to the input image portions in accordance with embodiments of the invention is described further below with reference to FIGS. 5B-C.

In some embodiments, the system may output the enhanced image from the output of the machine learning model. In some embodiments, the system may be configured to store the enhanced image. For example, the system may store the enhanced image on a hard drive or other memory of a device (e.g., a smartphone). In some embodiments, the system may be configured to pass the enhanced image for additional image processing. For example, the device may have additional image enhancement processing that is applied to photos that may be applied to the enhanced image obtained from the machine learning model.

In some embodiments, after obtaining an enhanced image from the output of the machine learning model, the process 210 returns to accessing another image to enhance (212) (as indicated by the dashed line from 216 to 212). For example, the system may receive a sequence of video frames from a video being captured or previously captured by an imaging device. The system may be configured perform 212-216 to each frame of the video. In some embodiments, the system may enhance each video frame in real time such that a user of a device viewing a feed of the video may view the enhanced video frames. If a video is being captured in low light (e.g., outdoors after sunset), the system may enhance each frame of video being captured such that video being viewed on a display of the imaging device is enhanced (e.g., colors are lightened up). As another example, the system may perform 212-216 to a series of photos captured by an imaging device.

Although specific training processes for training machine learning models for image enhancement are discussed above, one skilled in the art will recognize that any of a variety of processes may be utilized in accordance with embodiments of the invention. Generating pixel values for input images that may be utilized in such training processes are discussed below.

Generating Pixel Values for Input Images

FIG. 3A shows a flow chart of an example process 300 for determining a mapping of reference (or target) pixel values to respective sets of dark pixel values, in accordance with some embodiments of the invention. Process 300 may be performed by any suitable computing device. For example, process 300 may be performed by training system 110 described further above as part of generating training images 104 for training machine learning model 102. Process 300 may be performed to generate a mapping of pixel values to respective predetermined sets of dark pixel values. The mapping may be used, for example, as part of process 200 to generate input images corresponding to target images for training a machine learning model as described further above with reference to FIG. 2A.

Process 300 includes accessing (302) multiple images of a reference object. In some embodiments, a system may be configured to access a stored set of previously captured images of the reference object (e.g., from a storage medium of the system or another device). In some embodiments, the system may be configured to trigger capturing of the multiple images of the reference object (e.g., by a digital camera), and/or receive captured images. Any number of images may be included in the set of reference images. For example, the system may be configured to access 100, 500, 1000, 5000, or 10,000 images of the reference object.

In some embodiments, the reference object may be an object including multiple colors from the visible electromagnetic spectrum. For example, the reference object may be a printed image that includes different colors in respective locations of the image. FIG. 7 is a diagram 700 of an exemplary object with a rainbow of colors that span across a large portion of the visible electromagnetic spectrum that may be suitable as a reference object in certain embodiments of the invention. In some embodiments, the images of the reference object may be captured by an imaging device (e.g., a digital camera). In some embodiments, the images of the reference object may be captured using an image capture technology (e.g., imaging sensor model, or camera model) for which a machine learning model is to be trained. The images captured using the image capture technology may provide images that can be used to generate dark pixel values that would be generated by the image capture technology for colors in the reference object.

In some embodiments, the multiple images of the reference object may be captured to simulate low light conditions. In some embodiments, the images of the reference object may be captured with exposure times that simulate low light conditions. For example, the images of the reference object may be captured with an exposure time of approximately 1 ms, 10 ms, 20 ms, 30 ms, 40 ms, 50 ms, 60 ms, 70 ms, 80 ms, 90 ms, or 100 ms. In some embodiments, the images of the reference object may be captured in low light conditions. For example, the image of the reference object may be captured with a light source which provides an illumination of less than 50 lux. While specific exposure times and illumination values are discussed here, one skilled in the art will recognize that low light conditions may be characterized in any of a variety of manners in accordance with embodiments of the invention as appropriate to a particular application.

Process 300 includes identifying (304) pixels in the reference object images that correspond to a location in the reference object. When referring to a pixel value, the value can be an entire pixel value (e.g., an (R, G, B) value, an (R, Gr, Gb, B) value, etc.) and/or separate portions of the pixel value (e.g., just the R, G or B component, just the G, Gr, Gb, B component, etc.). The values at the identified pixels in the reference object images may be referred to as "dark pixel values." The location in the reference object may display a particular color (e.g., of the visible electromagnetic spectrum). For example, each of the reference object images accessed at block 302 may be a 500×500 pixel image of the reference object where pixel (1, 1) of each image corresponds to a first location in the reference object displaying a first shade of red. In this example, the system may identify the pixel values at pixel (1, 1) of the respective reference object image to be the pixel values corresponding to the first location in the reference object. Each of the pixel values may be a sample dark pixel value that may be generated by the image capture technology when capturing the first shade of red in low light. As described herein, including in conjunction with FIG. 4B, the dark pixel values may exhibit some variation from the corresponding value of the reference object at the first location due to noise. While specific image sizes and pixel locations are discussed above, one skilled in the art will recognize that any of a variety of sizes and locations may be utilized in accordance with embodiments of the invention.

The process 300 includes determining (306) a reference pixel value from the dark pixel values identified at block 304. In some embodiments, the system may be configured to determine the reference pixel value by determining a linear combination of the dark pixel values. For example, the system may determine a mean of the dark pixel values. As another example, the system may determine a sum of the dark pixel values. As yet another example, the system may determine a normalized sum of the dark pixel values. The reference pixel value may represent a pixel value that would be generated by the image capture technology for the color at the location in the reference object when there is a sufficient amount of lighting present (e.g., an illumination of greater than 200 lux). Thus the reference pixel value may indicate a target pixel value for the color at the location in the reference object. For example, the reference pixel value may be a target pixel value for a shade of red displayed at the location in the reference object (e.g., which due to how the dark pixel values are combined, removes variation that would otherwise be present due to noise).

In additional embodiments of the invention, reference pixel values may be determined by one or more image sensor noise models. One skilled in the art will recognize that any of a variety of noise models may be incorporated to generate synthetic input images for training data in accordance with embodiments of the invention. In several embodiments of the invention, image sensor noise models can include row noise, dynamic streak noise, clipping noise, and quantization noise. Some noise models are specific to a particular type of sensor, such as CMOS sensors. Some other noise models are disclosed, for example, in "Practical Poissonian-Gaussian noise modeling and fitting for single-image raw-data" by Alessandro Foi et al., IEEE Transactions on Image Processing, Volume 17, Issue 10, Oct. 2008, pp. 1737-1754; "Enhancing Low Light Videos by Exploring High Sensitivity Camera Noise" by Wei Wang et al., 2019 IEEE/CVF International Conference on Computer Vision (ICCV), Oct. 27-Nov. 2, 2019, pp. 4110-4118; and "A Physics-based Noise Formation Model for Extreme Low-light Raw Denoising" by Kaixuan Wei et al., Proceedings of the IEEE/CVF Conference on Computer Vision and Pattern Recognition (CVPR), 2020, pp. 2758-2767, the disclosures of which are hereby incorporated in their entirety.

The process 300 stores (308) a mapping of the reference pixel value to the dark pixel values that were identified (304). In some embodiments, the system may be configured to store a data structure storing the reference pixel values and the dark pixel values mapped to the reference pixel value. For example, the system may store a linked list including the reference pixel value and the dark pixel values. As another example, the system may store a row/column of a matrix where: (1) the reference pixel value is stored in a first entry of the row/column; and (2) the dark pixel values are stored in other entries of the row/column. In some embodiments, the system may be configured to store the reference pixel value in an image. For example, the system may set a pixel of the image to the reference pixel value. The system may store a mapping of the dark pixel values to the pixel of the image. In some embodiments, the system may be configured to store the mappings of the reference pixel values to a respective set of dark pixel values in a table. For example, the table may store a column of reference pixel values, and a row corresponding to each entry in the column storing dark pixel values corresponding to a respective reference pixel value. One skilled in the art will recognize that any of a variety of data structures may be utilized to store the mapping of the reference pixel value to the dark pixel values in accordance with embodiments of the invention.

In some embodiments, the techniques can store a data structure mapping the reference pixel value and dark pixel values, such as described below with reference to FIG. 4A. In some embodiments, the techniques can store a data structure that maps individual components of the reference pixel values and the dark pixel values, such as described below with reference to FIG. 4B.

In some embodiments, a set of dark pixel values mapped to a respective reference pixel value may simulate a distribution of pixel values that would be captured by an image capture technology (e.g., imaging sensor model or camera model) for a particular color in low light. For example, the location in the reference object may store a first shade of red. The reference pixel value generated from the dark pixel values may represent a "true" or "correct" pixel value that would be generated by the image capture technology. The corresponding dark pixel values may be a distribution of pixel values that would be generated by the image capture technology in low light.

The process 300 includes determining (310 whether all the locations in the reference object have been completed. In some embodiments, the system may be configured to determine if all the locations in the reference object have been completed by determining whether each of the locations corresponding to a grid of pixels captured by an imaging device have been processed. For example, the system may determine whether a reference pixel value and corresponding set of dark pixel values have been determined for the location corresponding to each of a 500×500 pixel grid that is captured by the imaging device. In some embodiments, the system may be configured to determine if all the locations in the reference object have been completed based on whether a reference pixel value and corresponding set of dark pixel values has been determined for each color displayed in the reference object. For example, the reference object may include a set (e.g., all) of the colors from the visible electromagnetic spectrum. The system may determine whether all the locations in the reference object have been completed by determining if a reference pixel value and corresponding set of dark pixel values has been determined for each of the colors. In some embodiments, the system may be configured to determine that a mapping has been determined for each color based on a user input.

If all the locations in the reference object have been completed (310), then process 300 ends. For example, the system may store a mapping including the determined reference pixel values and respective dark pixel values (e.g., in a storage medium of the system). If not all the locations in the reference object have been completed (310), then process 300 returns to performs 304-310 for another location in the reference object. For example, the system may perform the steps at blocks 304-310 for a different color displayed at the other location in the reference object.

Although in the example of FIG. 3A each location in the reference object may be processed sequentially, in some embodiments, the system may perform 304-308 for multiple locations in parallel. In several embodiments, the system may perform 304-308 for each of multiple different colors displayed at the multiple locations in parallel.

FIG. 3B shows a flow chart of an example process 320 for generating an input image (e.g., a dark image) corresponding to a target image, according to some embodiments of the invention. Process 320 may be performed by any suitable computing device. For example, process 320 may be performed by training system 110 described as part of generating training images 104 for training machine learning model 102. Process 320 may be performed as part of process 200 described herein with reference to FIG. 2A.

Process 320 includes accessing (322) a target image (e.g., of a scene). In some embodiments, the system may be configured to access an image captured by an imaging device (e.g., a digital camera) for which the machine learning model is to be trained. The target image may represent a target enhanced output image that is to be output by the trained machine learning model. In some embodiments, the target image may be captured by the imaging device. As an example, the imaging device may capture the target image by: (1) capturing an image of a scene; and (2) using the captured image as the target image. As another example, the imaging device may capture the target image by: (1) capturing a video of a scene; and (2) using a frames of the captured video as the target image.

In some embodiments, the system may be configured to access the target image captured by a particular image capture technology such that the machine learning model may be trained to enhance images captured by the image capture technology (e.g., camera model or imaging sensor model). For example, the machine learning model may be trained to illuminate images captured using the image capture technology in low light. The machine learning model may be trained for an error profile of the image capture technology such that the machine learning model may be optimized to correct errors characteristic of the image capture technology. In some embodiments, the system may be configured to access data obtained from a type of imaging sensor. As an example, the system may access target images captured by a particular model of a CMOS imaging sensor. In some embodiments, the system may be configured to access training images captured by a particular camera model. As described herein, for example, the system may access target images captured by a Canon EOS Rebel T7i EF-S 18-135 camera and/or any other type of camera. Some embodiments are not limited to a particular type of image capture technology described herein.

In some embodiments, the target image accessed (322) may be a portion of a captured image. The system may divide an image captured by an imaging device (e.g., a digital camera) into multiple portions, and select a portion to be the target image. For example, a captured image may be a 1000×1000 pixel image. The system may divide the image into 250×250 pixel portions and use each of the 250×250 pixel portions as a target image in process 320. In some embodiments, the image portions may be sized for a machine learning model that is to be trained using input images generated from process 320. For example, the machine learning model may receive an input of 62,500 pixel values and thus the system may access target images having 62,500 pixels (e.g., a 250×250 pixel image portion).

The process 320 proceeds to identifying (324) a target image pixel value. In some embodiments, a target image pixel value may include values for one or more channels (e.g., RGB channels). As described herein, when referring to a pixel value, the value can be an entire pixel value (e.g., an (R, G, B) value, an (R, Gr, Gb, B) value, etc.) and/or separate portions of the pixel value (e.g., just the R, G or B component, just the G, Gr, Gb, B component, etc.). The system may be configured to identify the target image pixel value by identifying a value for each of the channel(s). For example, the system may identify a target image pixel value to be RGB values of [140, 196, 222] at a first pixel in the target image (e.g., when processing the values as a whole). As another example, the system may identify a target image pixel value to be just an R value of 140, a G value of 196, and/or a B value of 222 (e.g., when processing each channel separately).

The process 320 includes identifying (326) a predetermined set of pixel values based on the target image pixel value. In some embodiments, the system may be configured to identify the set of predetermined pixel values by: (1) selecting one of the reference pixel values determined using a mapping process such as process 300 (described above with reference to FIG. 3A) based on the target image pixel value; and (2) identifying pixel values mapped to the selected reference pixel value in the mapping process (such as process 300) to be the predetermined set of pixel values. For example, the system may select a reference pixel value of [140, 196, 222] from the reference image pixel values (e.g., stored in a reference image), and identify the pixel values mapped to the reference pixel value in the mapping process (such as process 300) to be the predetermined set of pixel values.

In some embodiments, the system may be configured to select a reference pixel value based on the target image pixel value by matching the target image pixel value to a reference pixel value. For example, the system may search for the target image pixel value among multiple reference pixel values determined in a mapping process (such as process 300). In some embodiments, the system may be configured to select a reference pixel value by identifying one of multiple reference pixel values that is closest or most similar to the target image pixel value. For example, the system may: (1) determine a Euclidean distance between the target image pixel value and each of multiple reference pixel values; and (2) select the reference pixel value having the shortest Euclidean distance. As another example, the system may determine: (1) a correlation between the target image pixel value and each of multiple reference pixel values; and (2) select the reference pixel value having the greatest correlation. Many embodiments of the invention are not limited to any particular measure of similarity or distance for selecting a reference pixel value, as one skilled in the art will recognize that any of a number may be suitable.

The process 320 proceeds selecting (328) a pixel value from the predetermined set of pixel values that were identified (326). In some embodiments, the system may be configured to select the pixel value by randomly sampling the predetermined set of pixel values. For example, the predetermined set of pixel values may represent a probability distribution of dark pixel values that would be generated in low light by an image capture technology for a particular color that would be represented as the target image pixel value under sufficient lighting conditions. The system may randomly sample the predetermined set of pixel values as a random sampling of the probability distribution. For example, each one of the predetermined set of pixel values may include values for multiple channels (e.g., RGB), and the system may randomly sample one of the sets of RGB values. As another example, the system may: (1) separately sample from the red channel values, green channel values, and blue channel values in the predetermined set; and (2) determine a combination of the separately sampled RGB values to be the selected pixel value. In some embodiments, the system may be configured to select the pixel value from the predetermined set of pixel values by determining a maximum, minimum, median, or mean of the predetermined set of pixel values. Many embodiments of the invention are not limited to a particular technique for selecting a pixel value from the predetermined set of pixel values, but one skilled in the art will recognize that any of a number of techniques may be suitable for a particular application.

The process 320 proceeds set (330) an input image pixel to the pixel value that was selected (328). In some embodiments, the system may be configured to set channels of the input image pixel to channel values that were determined (328). For example, the system may set RGB values at the input image pixel to RGB values from the pixel value selected at block 328. In some embodiments, the input image pixel may correspond to a target image pixel. For example, the target image pixel value that was identified (324) may be a pixel value at pixel (5, 5) of a 1000×1000 target image. In this example, the system may set the input image pixel (5, 5) of a 1000×1000 input image to be the pixel value that was selected (328). In some embodiments, the input image pixel value may represent a dark pixel value for the target image pixel value. For example, the dark pixel value for the target image pixel value may indicate a pixel value that would be generated by an imaging device if a portion of a scene represented as the target image pixel value were captured in low light (e.g., with a light source having an intensity of less than 50 lux).

The process 320 proceeds to determining (332) whether an input image has been completed. In some embodiments, the system may be configured to determine whether the input image has been completed by determining whether the system has generated an input image pixel value for each pixel in the input image. For example, the input image may be a 500×500 pixel image. In this example, the system may determine that the input image has been completed when the system has set a pixel value at each of the input image pixels. In some embodiments, the system may be configured to determine whether the system has generated an input image pixel value corresponding to each pixel in at least a portion of the target image accessed at block 322. For example, the target input image may be a 500×500 pixel image. In this example, the system may determine that the input image has been completed when the system has generated an input image pixel value corresponding to each pixel in the target image.

If the input image is not complete (332), then process 320 proceeds to identifying (324) another target image pixel value. For example, the system may have determined an input image pixel value corresponding to a target image pixel value (1, 1) of a 500×500 pixel target image, and proceed to determining an input image pixel value corresponding to a target image pixel value at pixel (1, 2) of the target image.

If the input image is complete, then process 320 proceeds to determining (334) whether an input image has been generated for all of a set of target images. For example, the system may receive a set of target images for which the system is to generate corresponding input images. The system may determine (334) whether an input image has been generated for each of the set of target images (e.g., by determining if an input image has been stored for each of the target images). If all the target images have been completed, then process 320 ends. If not all the target images have been completed, then process 320 proceeds to access (322) another target image.

After generating one or more input images corresponding to respective target image(s) from performing process 320, the system may use the target image(s) and input image(s) to train a machine learning model (e.g., such as the training process discussed above with reference to FIG. 2A). For example, the system may apply a supervised learning algorithm (such as those described further above) to the input image(s) and target image(s) using the input image(s) as inputs and target image(s) as outputs.

FIG. 4A illustrates a schematic diagram 400 illustrating an example of generating an input image 404 corresponding to a target image 402, according to some embodiments of the invention. For example, the diagram 400 can be seen as illustrating performance of 324-330 of process 320 described above with reference to FIG. 3B.

As illustrated in FIG. 4A, the system identifies a target image pixel value 402A of the target image 402 (e.g., as described at 324 of process 320). The system uses the reference pixel value 406A from a reference image 406 based on the target image pixel value 402A. For example, the system may search for the target image pixel value in the reference image 406 to select the reference pixel value 406A. As another example, the system may select the reference pixel value 406A by identifying the reference pixel value 406A to be the closest or most similar to the target image pixel value 402A.

As illustrated in the example of FIG. 4A, the reference pixel value 406A can be represented as RGB values [105, 155, 186], although it should be appreciated that the reference pixel value can be stored in any of a variety of other formats (e.g., R, Gr, Gb, B), etc. The reference pixel value 406A may be stored as an entry 410 in a table 408 mapping reference pixel values to predetermined sets of pixel values (e.g., where each predetermined set of pixel values is from a corresponding input image of a reference object, such as determined for performing process 300 described herein with reference to FIG. 3A). In the example of FIG. 4A, the reference pixel value 406A is mapped to a predetermined set of pixel values including: [23, 54, 80], [30, 55, 82], and [23, 60, 79], among other values. The table 408 may include reference pixel values and corresponding predetermined sets of pixel values in addition to those shown in FIG. 4A, as indicated by the dotted lines.

As illustrated in FIG. 4A, the system selects a pixel value 410A from the predetermined set pixel values mapped to the reference pixel value 406A (e.g., as described at block 328 of process 320 described herein with reference to FIG. 3B). For example, the system may randomly select the pixel value 410A from the predetermined set of pixel values mapped to entry 410 in the table 408. In the example of FIG. 4A, the selected pixel value is [30, 55, 82]. The system may set an input image pixel value 404A to the selected pixel value 410A of [30, 55, 82] (e.g., as described at block 330 of process 320 described herein with reference to FIG. 3B). For example, the system may an input image pixel corresponding to a target image pixel to the selected pixel value 410A.

The process illustrated in FIG. 4A may be repeated for multiple pixels in the input image 404 until the input image 404 is completed. The target image 402 and the generated input image 404 may then be used to train a machine learning model (e.g., such as those described above with reference to FIG. 2A).

FIG. 4A is intended to be a general example of some techniques that can be used to generate the input image 404 based on learned distributions of pixel values from a set of input images. For illustrative purposes, FIG. 4A describes selecting R, G, B values collectively, since each value in the table 408 is an R, G, B set. However, in some embodiments each value can be analyzed separately to determine the input image. Further, different formats can be used to represent the values, such as raw Bayer pattern values, thermal/infrared sensor data, and/or the like. Additionally, in some embodiments, tables can be generated for the distributions of the input values against the target values. For example, separate tables can be generated for each R, G, B value, each R, Gr, Gb, B value, and/or the like, to store the distributions of the dark values to the light values.

FIG. 4B shows an example of generating and using distributions of values for each Bayer channel. FIG. 4B illustrates a schematic diagram 450 illustrating another technique for generating an input image corresponding to a target image, according to some embodiments of the invention. Generally, the techniques can include capturing a large number of dark images 452 (e.g. 500, 1000, 2000, 5000, etc.), which can be the input images. The dark images 452 can be dark images of a scene, as shown in this example, such as of the rainbow of colors discussed above in conjunction with FIG. 7. The dark images 452 can be combined in any of a variety of ways (e.g., linearly combined, such as by averaging the values of the images) to create a light image 454, which is the target image. For example, due to noise in the dark images, there may be some variation of the intensity value, which will therefore not always be the same as the corresponding intensity value of the light image 454. This effect of noise on the dark images 452 can be seen further in conjunction with the table 456, which is discussed further below.

In some embodiments, for each pixel location shared by each dark image 452 and the light image 454, the system can record the intensity value pair of {dark image value, light image value}, including for each Bayer channel. For each possible light image value (e.g., 0-255 for an 8-bit image, 0-1023 for a 10-bit image, etc.) in each Bayer channel (e.g., R, Gr, Gb, B), the system can us the recorded intensity value pairs to generate a distribution of input values associated with the target image value. For example, for a 10-bit image, there are 1023 values ×4 channels=4096 distributions of input values, where each distribution is a 1023-element vector containing a count of the number of dark value occurrences matched with its associated light value.

Table 456 shows an exemplary portion of a distribution of input values for the R Bayer channel (the other Gr, Gb and B channels each have an associated table) in accordance with several embodiments of the invention. Depending on the size of the image (e.g., 8-bits, 10-bits, etc.), the size of the table can typically be much larger than that shown in FIG. 4B (e.g., 256×256 for an 8-bit image, 1024×1024 for a 10-bit image, etc.). In table 456, each light value R0 (Red channel, light value 0), R1 (Red channel, light value 1), R2, and so on has a column of associated dark value distributions for each dark value 0, 1, 2 for the Red channel (which are not preceded with "R" to distinguish them from the light values), which can be caused by noise in the dark images. Thus, each entry in the table 456 is a count of the number of dark values in the dark images 452 for the light image value of the light image 454. For example, entry (0, R0) is 90, which means that ninety of the dark images 452 had a value of 0 for the corresponding light image 454 value of R0.

As shown in this example, the dark value distributions have a highest count for the corresponding light value. For example, for light value R3, there are 20 dark images with an intensity value pair (0, R3), there are 50 dark images with an intensity value pair (1, R3), there are 70 dark images with an intensity value pair (2, R3), there are 90 dark images with an intensity value pair (3, R3), there are 70 dark images with an intensity value pair (4, R3), there are 50 dark images with an intensity value pair (5, R3), and so on. Therefore, the highest correlation is for (3, R3) at 90. As a result, the counts of dark intensity values for each corresponding light intensity value can be viewed as generally following a bell curve that is centered around the dark value corresponding to the true light value. It should be appreciated that the numbers shown in the table 456 are intended to be illustrative, as in practice the numbers may likely have more variation (e.g., the counts that follow the diagonal from the top-left (0, R0) to the bottom-right (7, R7) may not have the same count, etc.).

The distributions for each channel can be used to create or simulate a realistic noisy/dark image 458 from any light image by sampling from the distributions. For example, for each pixel of the new light image, the system can use its corresponding intensity value and sample (e.g., randomly) from the associated distribution of dark values to generate the noisy/dark value for that pixel in the dark image 458. For example, for the R channel, if the intensity value in the new light image is R3, then the system can sample from the column R3 shown in table 456. The system can sample from these distributions by using any of a variety of methods, such as, but not limited to, monte carlo integration, inverse transform sampling, ancestral sampling, rejection sampling, importance sampling, markov chain monte carlo, and/or the like in accordance with many embodiments of the invention. For example, for inverse transform sampling, the techniques can include generating a cumulative distribution function (CDF) for each distribution by integrating the distribution, and then using the inverse CDF method.

Manipulating Image Training Data Sets for Training Efficiency

A machine learning model may be made faster (e.g., the processing speed at which the system converts "dark" images to "light" images) if the size of the input to the machine learning model is reduced. With a smaller input size, the machine learning model may have fewer parameters, and fewer operations to perform, and thus can be executed more quickly. A smaller input size may also reduce the training time required to train one or more parameters of the machine learning model. With a smaller input size, the machine learning model may have fewer parameters for which values need to be learned. This in turn can reduce the number of computations to be performed by a system during training. Accordingly, a smaller input to the machine learning model allows a system to train the machine learning model more efficiently.

In many embodiments of the invention, input images and/or target images used in a training set for training a machine learning model for image enhancement can be split into smaller portions. FIG. 5A shows a process 500 for training a machine learning model using portions of input and output images, in accordance with some embodiments of the invention. Process 500 may be performed, for example, as part of process 200 described above with reference to FIG. 2A. Process 500 may be performed using any suitable computing device. For example, process 500 may be performed as part of training a machine learning model that is to be used by image enhancement system 111 to enhance images captured in low light conditions.

Process 500 includes dividing (502) input images in the training set into multiple image portions. The input images may be, for example, images generated from performing process 320 described herein with reference to FIG. 3B. In some embodiments, the system may be configured to divide a respective input image into a grid of equally sized portions. As a simple, illustrative example not intended to be limiting, an input image of size 500×500 may be divided into a grid of 100×100 image portions. In some embodiments, the system may be configured to dynamically determine a size of the image portions that an input image is to be divided up into. For example, the system may be configured to analyze the image to identify objects in the image. The system may determine a size of the image portions that ensures that image portions include complete objects as much as possible. In some embodiments, the system may be configured to determine a size of the image portions to minimize training time, and/or time required for image enhancement. For example, the system may determine a size of the image portions based on an expected time for training a machine learning model that is to process inputs of the size of the image portion. In another example, the system may determine a size of the image portions based on an expected time to process an input having the size when the machine learning model is used to perform image enhancement. In some embodiments, the system may be configured to divide up all the input images into portions of the same size. In some embodiments, the system may be configured to divide input images into portions of different sizes.

The process 500 divides (504) output images in the training set into image portions. The output images may be target images corresponding to the input images. In some embodiments, the system may be configured to divide up the output images into portions in the same manner as corresponding input images were divided up. For example, if a 500×500 input image was divided in to 100×100 image portions, the corresponding output image in the training set may also be divided into 100×100 image portions.

Although FIG. 5A shows dividing of input images into portions as a separate step, in some embodiments, input image portions may be generated from portions of target images. For example, a portion of a target image may be used to generate a respective input image portion in a process such as process 320 described further above with reference to FIG. 3B. Thus, in several embodiments of the invention the system may not separately divide an input image into portions, as the input image portions corresponding to each target image portion may be generated separately.

The process includes using the input image portions and output image portions for training (506) the machine learning model. In some embodiments, the system may be configured to use the input image portions and output image portions as individual inputs and corresponding outputs for performing supervised learning for training the machine learning model. In some embodiments, the input image portions may form the set of dark images, and the output image portions may form the set of corresponding bright images according to which the machine learning model is trained. Any of a variety of types of machine learning models may be utilized in accordance with embodiments of the invention, such as those described further above.

Manipulating Image Training Data Sets for Training Efficiency

FIG. 5B shows a process 510 for enhancing a source image by dividing the source image up into portions, in accordance with some embodiments of the invention. Process 510 may be performed using any suitable computing device. Process 510 may be performed as part of enhancing an image. For example, process 510 may be performed by image enhancement system 111 as part of enhancing an image obtained from an imaging device. For example, process 510 may be performed as part of a process such as process 210 described further above with reference to FIG. 2B.

The process 510 includes receiving (512) a source image. In some embodiments, the system may obtain an image captured by an imagine device (e.g., a digital camera). For example, the system may receive the image from an imaging sensor of the imaging device. In another example, the process may be executed as part of an application on the imaging device, and access the image captured by the imaging device from a storage of the imaging device. In yet another example, the system may obtain the captured image from another system separate from the imaging device (e.g., cloud storage).

The process 510 divides (514) the source image into multiple image portions. In some embodiments, the system may be configured to divide the image into the same size as input image portions in a training set of images used for training the machine learning model. In some embodiments, the system may be configured to divide the image into multiple equally sized portions. In some embodiments, the system may be configured to analyze the image to determine a size of portions, and then divide the image into portions having the determined size. For example, the system may be configured to identify one or more objects in the image, and determine a size of the image portions based on the identification of the object(s). In some embodiments, the system may be configured to determine sizes of the image portions to mitigate the effects of contrast changes in the portions. For example, if a 100×100 sized image portion has objects between which there is a large contrast, the image portion may be expanded to reduce the impact of the contrast differences in the image portion.

The process 510 selects (516) one of the multiple image portions obtained at block 514. In some embodiments, the system may be configured to select one of the image portions randomly. In some embodiments, the system may be configured to select one of the image portions in sequence based on a position of the image portion in the original image. For example, the system may select image portions starting from a specific point in the image (e.g., a specific pixel position).

The process 510 uses (518) the selected image portion as an input to a machine learning model. In some embodiments, the machine learning model may be a trained machine learning model for performing image enhancement on images captured in low light conditions. For example, the machine learning model may be trained machine learning model 112 described above with reference to FIGS. 1A-B and/or trained according to process 200 described above with reference to FIG. 2A. The machine learning model may include one or more models (e.g., neural network models) for which the selected image portion may be used as an input. For example, pixel values of the image portion may be provided as input to the machine learning model.

The process 510 proceeds to obtain (520) a corresponding output image portion. In some embodiments, the system may obtain an output of the machine learning model. For example, the system may obtain an output of a trained neural network model into which the image portion was inputted. In some embodiments, the system may be configured to obtain pixel values of an enhanced version of the image portion from the machine learning model. For example, the input image portion may have been taken in low light conditions. As a result, one or more objects in the image portion may not be visible, may be blurry, or the image portion may have poor contrast. The corresponding output image may have increased illumination such that the object(s) are visible, clear, and the image portion has improved contrast.

The process 510 determines (522) whether all of the image portions that the originally received image was divided into have been processed. For example, if the original image had a size of 500×500 and was divided into 100×100 image portions, the system may determine whether each of the 100×100 image portions has been processed. The system may determine if each of the 100×100 image portions has been inputted into the machine learning model, and whether a corresponding output portion has been obtained for each input portion.

If there are portions of the received image that have not been processed, then process 510 proceeds to select (516) another image portion, and processes the image portion as described above in 518-520. If all the image portions have been processed, then process 510 proceeds combine (524) the obtained output image portions to generate an output image. In some embodiments, the system may be configured to combine output image portions generated from outputs of the machine learning model to obtain the output image. For example, if the original image was a 500×500 image that was divided into 100×100 portions, the system may combine outputs from the machine learning model of 100×100 images. The system may be configured to position each of the 100×100 output image portions in a position of the corresponding input image portion in the originally obtained image to obtain the output image. The output image may be an enhanced version of the image obtained at block 512. For example, the original image may have been captured by the imaging device in low light conditions. The obtained output image may be an enhanced version of the captured image that improves a display of a scene captured in the original image (e.g., improved contrast and/or reduced blurring).

Reducing Edge Distortion in Image Processing using Convolution

In some embodiments, the machine learning model may be configured to perform one or more convolution operations on an image portion that is input into the machine learning model. A convolution operation may be performed between a filter kernel and pixel values of the input image portion. The convolution operation may involve determining values of a corresponding convolution output by taking a linear combination of pixel values that surround a pixel position in the image portion for which convolution is being performed. For example, if the filter kernel is a 5×5 matrix, the convolution operation may involve multiplying pixel values of pixels in a 5×5 matrix around a respective pixel position by weights in the kernel, and summing them to obtain a value for the respective pixel position in the output of the convolution operation. One problem that can occur in performing convolution operations is that pixel positions at the edge of an image portion may not have pixels surrounding a respective pixel position on all sides of the position. For example, for a convolution operation with a 5×5 kernel matrix, a pixel position on the left edge of an image portion will not have any pixels to its left with which the kernel can be convolved. To address this, conventional systems may pad the image portion with 0 value pixels. This, however, may cause distortions on the edge of the image portion as the 0 value pixels do not represent information from the image captured by the imaging device.

FIG. 5C shows a process 550 for mitigating the above-described problem of edge distortion during a filtering operation performed by a machine learning model, according to some embodiments of the invention. Process 550 may be performed during training of the machine learning model and/or image enhancement. Process 550 may be performed by any suitable computing device. For example, process 550 may be performed as part of training a machine learning model (e.g., during process 200 described herein with reference to FIG. 2A) that is to be used by image enhancement system 111 to enhance images captured in low light conditions, and/or performed by enhancement system 111 during image enhancement (e.g., during process 210 described herein with reference to FIG. 2B).

The process 550 includes obtaining (552) an image portion. The image portion may be obtained, for example, as described above in processes 500 and/or 510 with reference to FIGS. 5A-B.

Process 550 proceeds to determine (554) a cropped portion of the image portion. In some embodiments, the system may be configured to determine a cropped portion of the image portion to be a subset of the pixels in the image portion. For example, if the image portion is a 100×100 image, the system may determine a cropped portion of the image portion that is a 98×98 image in the center of the 100×100 image. This may ensure that pixels at the edge of the cropped portion have surrounding pixels for convolution operations performed on the cropped portion.

Process 550 proceeds to use (556) the cropped portion of the image portion as an input to the machine learning model. In some embodiments, the system may be configured to pass the entire original image portion as input, but apply filter operations (e.g., convolution) to the cropped portion of the image portion. This may eliminate the distortion at edges of the enhanced output image portion that is generated from an output of the machine learning model. For example, if a convolution operation is performed with a 5×5 filter kernel on a 98×98 cropped portion of a 100×100 image portion, convolution performed on the pixels at the edge of the 98×98 cropped portion will have pixels that align with each of the positions in the 5×5 filter kernel. This may reduce edge distortions compared to conventional techniques such as padding the image portion with 0 valued pixels.

In some embodiments, the system may be configured to determine image portion sizes that incorporate additional pixels to account for a subsequent cropping operation that is to be performed by the system (e.g., the system may crop an enhanced portion of an image prior to stitching the resulting processed portions together to create the full enhanced image). For example, the system may be configured to obtain image portions with sizes of 102×102, as the system may subsequently perform filtering operations on cropped 100×100 portions of the image portions. By removing the additional pixels during the filtering operation, the cropped portions may be free of the edge effects discussed above.

Although specific processes for training and using machine learning models for image enhancement are discussed above with respect to the figures, one skilled in the art will recognize that any of a variety of similar processes may be utilized in accordance with embodiments of the invention. Furthermore, while specific characteristics such as images sizes and pixel values may be discussed above, one skilled in the art will recognize that any of a variety of sizes, values, and/or other characteristics may be utilized in accordance with embodiments of the invention. For example, images and/or image portions in various embodiments of the invention may have any of a variety of sizes such as, but not limited to, 640×480, 1366×768, 1920×1080, or any size that is appropriate to the application. Next will be described techniques for improving image enhancement of source images that are influenced by environmental conditions and other sources of large scale noise, by incorporating simulated environmental effects and other types of noise into input images used as training data.

Removing Perturbations from Images

Images of real-world environments captured by imaging devices (e.g. digital cameras, image sensors, medical imaging devices, and/or electromagnetic field sensors) may be of lower quality than desired due to noise within the imaged environments. In some cases, environmental noise may be caused by perturbations, such as snow, rain, haze, dust, or glare, within the imaged environment. Environmental perturbations may produce noise that changes over time, such as in the example of particles (e.g. snow, rain, dust) moving within the imaged environment, and/or due to motion of the imaging device with respect to the environmental perturbations. Such environmental perturbations may result in loss of image data for portions of the imaged environment that are obscured or distorted by the perturbations, resulting in captured images of poor quality. Captured images of poor quality, such as due to noise from environmental perturbations, may result in poor performance for applications relying on image data, such as computer vision applications (e.g. object detection, facial recognition, image segmentation, and tracking).

Many embodiments of the invention utilize techniques for enhancing noisy images, such as those captured under perturbed environmental conditions, to obtain a higher quality image without requiring an addition or change in existing hardware of a device. The techniques can also provide better performance than other conventional techniques, such as traditional image signal processing (ISP) algorithms. The enhanced images may further provide improved performance of other applications that utilize the image such as image segmentation, object detection, facial recognition, and/or other applications.

Several embodiments of the invention include techniques for controlled generation of input-output sets of images that can be used to train a machine learning model used to enhance new input (or source) images or video frames. In some embodiments, the machine learning model can be used to remove perturbations, such as snow, rain, haze, dust, or glare, from input images to produce unperturbed, high quality target images. For the purpose of explanation below, without intending to be limiting, the input images may also be referred to herein as "perturbed images," and the output images may be referred to herein as "target images" and/or "unperturbed images." Target images may represent aspects of target unperturbed outputs that are to be generated by the machine learning model. These input and output images may be incorporated as training data into processes such as those discussed further above to train machine learning models and those machine learning models may be used to enhance images in processes such as those discussed further above.

It should be understood that the terms "perturbed images" and "unperturbed images" are used herein for ease of explanation, but are not intended to only refer to perturbations or to exclude characteristics of images that do not relate to perturbations. For example, the techniques can be used to process noisy images to generate images with a better signal-to-noise ratio and/or to remove noise aspects from the images (e.g., to remove perturbations, such as snow, rain, ice, etc.). Therefore, while some examples described herein refer to perturbed images and unperturbed images, it should be appreciated that the techniques can be used to process various types of undesirable aspects of the input images, including noise, brightness, contrast, blurring, artifacts, and/or other noise artifacts. Thus, the input images processed using the techniques described herein can be any type of image with undesirable aspects, and the output images can represent the image with the undesirable aspects mitigated and/or removed (e.g., which can be generated using machine learning techniques, as described herein).

Although environmental perturbations are prevalent in real-world images, many state-of-the-art supervised machine learning models are trained using images that contain minimal or zero perturbation. In accordance with embodiments of the invention, enhancement of raw imaging data using supervised learning (e.g., with neural networks) can be achieved using input-output, also referred to herein as input-target, training pairs of perturbed and unperturbed images, such as pairs of perturbed input images and corresponding unperturbed target images of a same environment.

Conventional techniques for generating input-target image pairs may involve applying a mask to a single unperturbed target image in order to produce an input image that appears perturbed relative to the target image. Input images generated by such techniques, however, may be significantly less realistic than desired due to the limitations of the masks used to produce such input images. In particular, applying a mask in such a manner does not provide for any temporal aspects of the noise and/or perturbation. For example, for a temporally-related sequence of images of a rainy or snowy scene, the rain or snow typically moves across the images in a particular way, which can be affected by conditions such as the temperature, atmosphere, size of the rain drops or snowflakes, wind, and/or the like. Simply applying a mask to an image fails to account for these and other temporal aspects of perturbations that can be exhibited by a temporally related sequence of images. Performance of a machine learning model in enhancing images captured by a device can be limited by the quality of training data (e.g., input images and/or corresponding target output images) used to train the machine learning model. In particular, a machine learning model trained using input images that more accurately represent images that would be captured by a device under perturbed environmental conditions will often provide better enhancement of images captured by the device in such conditions.

It is often desirable to provide a broad range of real-world training data, including data collected for various real-world scenes and locations. However, obtaining perturbed and/or unperturbed target images in this manner can be difficult in a practical sense. That is, when an image is captured of an environment containing perturbations, image data for portions of the environment obscured or distorted by the perturbations may be permanently lost, such that obtaining an unperturbed image of the environment is impossible. This can occur, for example, when an imaging device captures an image of an environment containing both perturbations (e.g. falling snow) as well as other changing elements to be imaged (e.g. trees with moving leaves, cars or people moving in the background, etc.). In such an example, obtaining image data for the changing elements of the environment may be impossible if they were obscured or distorted by perturbations in the original image. As another example, while perturbed images may be captured of various scenes, it can be difficult to capture corresponding unperturbed images since some of the perturbations of interest may only occur naturally, and therefore can be difficult to plan for during image capture.

Additionally, even in cases where capturing perturbed and/or unperturbed images is possible, in order to capture a wide data set with images of different scenes, which can also be desirable for training purposes, an operator needs to physically move the camera to each location and/or around at various imaging points at each location. This constraint may further limit the practicality of adequately gathering sufficient training data from real-world images. For example, in order to capture a sufficient number of input-target image pairs of a scene may require moving the camera to hundreds or thousands of locations within the scene as well as hundreds or thousands of different locations. Since such techniques require the camera to be physically present at each location, it can significantly limit the robustness of the training data due to practical constraints on time, travel, and/or the like.

Furthermore, as compared to other forms of noise, environmental perturbations exhibit a high degree of spatial and temporal correlation. For example, in the case of perturbations caused by particles, the particles may tend to cluster in space and time and/or be influenced by various other factors, such as wind, atmosphere, temperature, the nature of the perturbation, and/or the like. The complex and highly-structured nature of environmental perturbations is such that conventional techniques for simulating noise, as described above, are unable to simulate noise with the degree of realism preferred for use in training machine learning models. Various types of machine learning models can be used in accordance with embodiments of the invention. For example, U.S. Patent Publication No. 2020/0051260 (Ser. No. 16/534,460), entitled "Techniques for Controlled Generation of Training Data for Machine Learning Enabled Image Enhancement," filed on Aug. 7, 2019, describes various machine learning models and techniques that can be used in accordance with embodiments of the invention. The disclosure U.S. Patent Publication No. 2020/0051260 is incorporated herein by reference in its entirety.

Accordingly, many embodiments of the invention employ techniques to generate training data by simulating real-world data with a high degree of realism. These techniques may include producing pairs of input-target images, wherein the input image contains simulated noise (e.g., including perturbations) and the target image does not contain simulated noise. In some embodiments, the simulated noise can be represented over time in order to provide temporal data regarding the noise.

In some embodiments, a set of target images may be produced, where the set of target images includes a set of temporally-related images. In several such embodiments, each image of the temporally-related images may have an associated temporal indicator (e.g., timestamps, time offsets, frame numbers, etc.) that indicates the temporal relationship of the image to the set of temporally-related images. For example, the target images may include frames of a video, and each target image may have an associated temporal indicator that is a timestamp associated with the corresponding frame of the video. In some embodiments, the target images may be consecutive frames of a video. In some embodiments, the target images may be non-consecutive frames of a video and may comprise, for example, every other frame of a video or, in another example, frames of a video captured with a certain temporal separation (e.g. 1 second apart). In some embodiments, a sequence of video frames comprising, for example, 8 images, may be grouped together for processing by the machine learning model.

In some embodiments of the invention, a plurality of input images may be produced, where each input image of the plurality of input images includes the corresponding target image and a simulated noise mask. In such embodiments, the simulated noise mask may be selected based on a temporal indicator associated with the simulated noise mask, as described below, and the temporal indicator associated with the corresponding target image. The simulated noise mask may be a mask which can be applied to an existing image in order to simulate noise within that image. For example, a simulated noise mask applied to an existing image may specify locations within the image where the existing pixels of the image are to be replaced with pixels representing noise. In some embodiments, a simulated noise mask may be applied to a number of different images in order to produce a "noisy" image corresponding to each of the number of different images. A simulated noise mask may represent any of a variety of types of noise which may occur in real-world images, including perturbations such as snow, dust, haze, glare, etc., as described above.

In generating simulated noise masks representing perturbations, it may be advantageous to generate a plurality of simulated noise masks, where each simulated noise mask of the plurality of simulated noise masks has an associated temporal indicator that indicates the temporal relationship of the simulated noise mask to the plurality of simulated noise masks. For example, the plurality of simulated noise masks may represent perturbations caused by particles, such as snow or raindrops, moving within an environment. In this example, each of the plurality of simulated noise masks represents the perturbations caused by the particles at a particular point in time, as indicated by the temporal indicator associated with that simulated noise mask. In some embodiments, the simulated noise masks may be generated by digital or physical simulation techniques as described in detail below.

Exemplary Digital Simulation Aspects

According to some embodiments, a simulated noise mask may be generated using digital simulation techniques. The digital simulation techniques can include, at least in part, using a rendering engine to produce a distribution of simulated noise data given as input a set of parameters. The set of parameters may account for a variety of conditions that can impact the noise data such as, but not limited to, number and lifetime of particles, source and speed of particles, wind speed, dampening factor of air, particle density and size, and motion of the imaging device. In some embodiments, the rendering engine may be a physics-based rendering engine. Alternatively, or additionally, the rendering engine may be a three-dimensional (3D) graphics rendering pipeline, such as Blender for example.

The digital simulation techniques may further include using the rendering engine to generate simulated noise masks based on the distribution of simulated noise data produced by the rendering engine. Each of the simulated noise masks may be further associated with a temporal indicator by the rendering engine. For example, the rendering engine may produce a distribution of simulated noise data representing snow (and/or other perturbations) falling within an environment over time. The resulting simulated noise masks may indicate locations of the snow particles at particular times within the distribution of simulated noise data, as indicate by the temporal indicators. The simulated noise masks, as described above, may be applied to images or collated to videos in order to produce realistic simulations of real-world images.

FIG. 5D illustrates a flow chart of a process for applying a sequence of simulated noise masks to a sequence of temporally-related target images in accordance with several embodiments of the invention. The process 560 includes obtaining or receiving (562) a set of target images. The target images may represent a sequence of action in a scene, as in a video sequence. The process identifies or assigns (564) time indicators to each of the target images. The time indicators can be an absolute or a relative index indicative of the temporal relationship between the target images. The process generates or receives (566) a set of simulated noise masks, where each simulated noise mask corresponds to a target image. In some embodiments, the simulated noise masks may also be indexed by time. The process applies (0568) the simulated noise masks to the corresponding target images, resulting in a set of input images. In many embodiments, each resulting input image is a combination of a target image and its corresponding simulated noise mask.

FIG. 5E illustrates how individual images or frames of video may be modified by a process in accordance with embodiments of the invention, such as using the process 560 described above. In the depicted example, three target images have been captured at times separated by one second, as indicated by the corresponding temporal indicators (t=0 through t=2). In this example, the environment imaged in the target images contains a scene involving moving portions (e.g. the human figures) as well as static portions (e.g. the moon and ground), resulting in target images that reflect these changes over time. As described above, the target images in FIG. 1 are unperturbed images, that do not contain environmental perturbations or other forms of noise.

The example of FIG. 5E further depicts a sequence of three simulated noise masks. The simulated noise masks may be produced, for example, by the digital or physical simulation techniques described herein. In the illustrated example, the simulated noise masks represent particles in motion. The particles, as depicted in the simulated noise masks, may be snow particles falling through the air. Each simulated noise mask has a corresponding temporal indictor (t=0 through t=2). With each successive temporal indicator, the corresponding simulated noise mask depicts the snow particles in a more advanced state of falling, reflecting downwards motion of the simulated snow particles.

The example of FIG. 5E further depicts a sequence of three input images, generated using the target images and the simulated noise masks. In the illustrated example, the input images are generated by overlaying the simulated noise masks on top of the corresponding target images. It should be appreciated that this overlaying is merely illustrative, and may indicate any method of applying the mask as described herein. The correspondence between the simulated noise masks and the target images is determined based on the associated temporal indicators. In this example, the simulated noise mask at t=0 is applied to the target image at t=0, and so on, with the simulated noise masks for t=1 and t=2 being applied to the target images for t=1 and t=2. It should be appreciated that the temporal indicators may be in other forms than those depicted, such as timestamps, frame numbers, etc., as described herein. It should be further appreciated that the temporal indicators for the target images and simulated noise masks do not need to exactly match, as in this example, but may simply be determined to have a correspondence. Such a correspondence may, for example, be based on a fixed temporal difference between the temporal indicators of the simulated noise masks and the temporal indicators of the target images.

While a specific process and types of noise masks are discussed above, one skilled in the art will recognize that any of a variety of processes and noise masks may be utilized in accordance with embodiments of the invention as appropriate to a particular application.

Exemplary Physical Simulation Aspects

According to some embodiments, a simulated noise mask may be generated using physical simulation techniques. The physical simulation techniques may comprise, in part, using a machine to produce perturbations within an environment. The machine may be, for example, a snow machine, wherein liquid water may be converted into solid snow particles. In some embodiments, the machine may use other liquids to produce other varieties of particles. In some embodiments, the machine may be a machine which produces other forms of perturbations, such as dust, haze, or rain.

The physical simulation techniques may further comprise using an imaging device to capture an image of the environment without perturbations and/or containing perturbations. The imaging device may be static, or may be in motion to simulate aspects of perturbations. In some embodiments, the background of the environment may be configured to allow a simulated noise mask representing the perturbations to be extracted. For example, the background of the environment may be a screen configured to provide high contrast with the perturbations. This screen may be, for example, a green screen.

Over time, this physical simulation technique may generate a plurality of simulated noise masks corresponding to images of the perturbations captured over time. As described above, a temporal indicator can be associated with each of these simulated noise masks. The simulated noise masks, as described in the foregoing, may be applied to images or collated to videos in order to produce realistic simulations of real-world images.

In some embodiments, in addition to and/or as an alternative to extracting a simulated noise mask, the physical simulation techniques described herein can be used to obtain an unperturbed image by capturing an image of the same environment without the perturbations. For example, if the background of the environment is static aside from the perturbations, the imaging device may capture an image of the environment in an unperturbed state before the machine begins producing perturbations, or after the machine has ceased producing perturbations.

Instead of and/or in addition to applying simulated noise masks to target images to produce input images, as described in detail in the foregoing, the present embodiment may produce input-target image pairs directly. These image pairs may be utilized to train a machine learning model, as described herein.

Systems for Training and Using Machine Learning Models for Image Enhancement

FIG. 6 shows a block diagram of a specially configured distributed computer system 600 in accordance with many embodiments of the invention. As shown, the distributed computer system 600 includes one or more computer systems that exchange information. More specifically, the distributed computer system 600 includes computer systems 602, 604, and 606. As shown, the computer systems 602, 604, and 606 are interconnected by, and may exchange data through, a communication network 608. The network 608 may include any communication network through which computer systems may exchange data. To exchange data using the network 608, the computer systems 602, 604, and 606 and the network 608 may use various methods, protocols and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, SS6, JSON, SOAP, CORBA, REST, and Web Services. To ensure data transfer is secure, the computer systems 602, 604, and 606 may transmit data via the network 608 using a variety of security measures including, for example, SSL or VPN technologies. While the distributed computer system 600 illustrates three networked computer systems, the distributed computer system 600 is not so limited and may include any number of computer systems and computing devices, networked using any medium and communication protocol.

As illustrated in FIG. 6, the computer system 602 includes a processor 610, a memory 612, an interconnection element 614, an interface 616 and data storage element 618. To implement at least some of the aspects, functions, and processes disclosed herein, the processor 610 performs a series of instructions that result in manipulated data. The processor 610 may be any type of processor, multiprocessor or controller. Example processors may include a commercially available processor such as an Intel Xeon, Itanium, Core, Celeron, or Pentium processor; an AMD Opteron processor; an Apple A10 or A5 processor; a Sun Ultra-SPARC processor; an IBM Power5+ processor; an IBM mainframe chip; or a quantum computer. The processor 610 is connected to other system components, including one or more memory devices 612, by the interconnection element 614.

The memory 612 stores programs (e.g., sequences of instructions coded to be executable by the processor 610) and data during operation of the computer system 602. Thus, the memory 612 may be a relatively high performance, volatile, random access memory such as a dynamic random access memory ("DRAM") or static memory ("SRAM"). However, the memory 612 may include any device for storing data, such as a disk drive or other nonvolatile storage device. Various examples may organize the memory 612 into particularized and, in some cases, unique structures to perform the functions disclosed herein. These data structures may be sized and organized to store values for particular data and types of data.

Components of the computer system 602 are coupled by an interconnection element such as the interconnection mechanism 614. The interconnection element 614 may include any communication coupling between system components such as one or more physical busses in conformance with specialized or standard computing bus technologies such as IDE, SCSI, PCI and InfiniBand. The interconnection element 614 enables communications, including instructions and data, to be exchanged between system components of the computer system 602.

The computer system 602 also includes one or more interface devices 616 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 602 to exchange information and to communicate with external entities, such as users and other systems.

The data storage element 618 includes a computer readable and writeable nonvolatile, or non-transitory, data storage medium in which instructions are stored that define a program or other object that is executed by the processor 610. The data storage element 618 also may include information that is recorded, on or in, the medium, and that is processed by the processor 610 during execution of the program. More specifically, the information may be stored in one or more data structures specifically configured to conserve storage space or increase data exchange performance. The instructions may be persistently stored as encoded signals, and the instructions may cause the processor 610 to perform any of the functions described herein. The medium may, for example, be optical disk, magnetic disk or flash memory, among others. In operation, the processor 610 or some other controller causes data to be read from the nonvolatile recording medium into another memory, such as the memory 612, that allows for faster access to the information by the processor 610 than does the storage medium included in the data storage element 618. The memory may be located in the data storage element 618 or in the memory 612, however, the processor 610 manipulates the data within the memory, and then copies the data to the storage medium associated with the data storage element 618 after processing is completed. A variety of components may manage data movement between the storage medium and other memory elements and examples are not limited to particular data management components. Further, examples are not limited to a particular memory system or data storage system.

Although the computer system 602 is shown by way of example as one type of computer system upon which various aspects and functions may be practiced, aspects and functions are not limited to being implemented on the computer system 602 as shown in FIG. 6. Various aspects and functions may be practiced on one or more computers having a different architectures or components than that shown in FIG. 6. For instance, the computer system 602 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 602 may be a computer system including an operating system that manages at least a portion of the hardware elements included in the computer system 602. In some examples, a processor or controller, such as the processor 610, executes an operating system. Examples of a particular operating system that may be executed include a Windows-based operating system, such as, Windows NT, Windows 2000 (Windows ME), Windows XP, Windows Vista or Windows 6, 8, or 6 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 610 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C#(C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture.

It is to be appreciated that embodiments of the methods and apparatuses described herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features described in connection with any one or more embodiments are not intended to be excluded from a similar role in any other embodiments.

The terms "approximately," "substantially," and "about" may be used to mean within +20% of a target value in some embodiments, within +10% of a target value in some embodiments, within +5% of a target value in some embodiments, and yet within +2% of a target value in some embodiments. The terms "approximately" and "about" may include the target value.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of enhancing a source image using an image enhancement machine learning model comprising:
    capturing a source image using a digital imager component of a communication device;
    processing the source image using an image enhancement machine learning model on the communication device, wherein the image enhancement machine learning model is trained by:
    using at least one processor to perform:
        accessing a set of target images, wherein the target images represent a target output of the image enhancement machine learning model;
        generating a set of input images, wherein the set of input images correspond to one or more target images in the set of target images and represents content in at least one target image modified to simulate being captured under less ideal lighting conditions than in the at least one target image based on determining one or more potential dark pixel values associated with pixels in the at least one target image;
        selecting a first reference pixel, based on a reference image, in response to determining that the first reference pixel is a closest match to the one or more potential dark pixel values; and
        training the image enhancement machine learning model using a training dataset,
    wherein the training dataset comprises the set of target images and the generated set of input images corresponding to the one or more target images to obtain a trained image enhancement learning model; and
    outputting the processed source image.

2. The method of claim 1, wherein the training the image enhancement machine learning model using the training dataset comprises:
    dividing the set of input images into a plurality of input image portions;
    dividing the one or more target images into a plurality of target image portions; and
    wherein the training dataset comprises the plurality of input image portions and the plurality of target image portions.

3. The method of claim 1, wherein the processing the source image using the image enhancement machine learning model on the communication device comprises:
    dividing the source image into a plurality of source image portions;
    obtaining output image portions generated by the image enhancement machine learning model using the plurality of source image portions as inputs; and
    combining the output image portions into another processed source image.

4. The method of claim 1, wherein the generating the set of input images comprises:
    for the set of input images:
        identifying a first target image pixel value in the at least one target image;
        identifying a first set of predetermined pixel values based on the first target image pixel value;
        selecting a pixel value, from the first set of predetermined pixel values, mapped to the first reference pixel; and
        setting a first pixel in the set of input images to the pixel value selected from the first set of predetermined pixel values.

5. The method of claim 4, wherein the identifying the first set of predetermined pixel values comprises:
    accessing data mapping a first plurality of pixel values to the first reference pixel and a second plurality of pixel values to a second reference pixel value;
    selecting the first reference pixel based on a first pixel value at a first pixel in the at least one target image; and
    identifying the first plurality of pixel values to be the first set of predetermined pixel values.

6. The method of claim 4, further comprising generating the first set of predetermined pixel values corresponding to the first target image pixel value.

7. The method of claim 4, further comprising:
    accessing a plurality of images of a reference object;
    identifying sets of pixel values from the plurality of images corresponding to respective locations in the reference object;
    for the sets of pixel values, determining a respective reference pixel value based on at least some pixel values in the sets of pixel values; and
    storing a mapping of reference pixel values to respective pixel values of the sets of pixel values.

8. The method of claim 7, wherein the identifying the first set of predetermined pixel values comprises:
    identifying a first pixel value of the reference pixel values in the mapping based on the first pixel; and
    identifying the first set of predetermined pixel values to be a set of pixel values mapped to the first reference pixel in the mapping.

9. The method of claim 4, wherein the selecting the pixel value from the first set of predetermined pixel values comprises randomly sampling the pixel value from the first set of predetermined pixel values.

10. The method of claim 4, wherein the first target image pixel value, the first set of predetermined pixel values, the selected pixel value, and the first pixel comprise a Red, Green, Blue (RGB) format, a Bayer pattern format of (R, Gr, Gb, B), a single RGB channel, or a single Bayer pattern channel.

11. The method of claim 1, further comprising:
    identifying a second pixel value at a second pixel in the at least one target image;
    identifying a second set of predetermined pixel values based on the second pixel value;
    selecting a pixel value from the second set of predetermined pixel values; and
    setting a second pixel in the set of input images to the pixel value selected from the second set of predetermined pixel values.

12. The method of claim 1, further comprising:
accessing an image;
providing the image as input to the trained image enhancement machine learning model to obtain a corresponding output indicating updated pixel values for the image; and
updating the image using the output from the trained image enhancement machine learning model.

13. The method of claim 1, further comprising:
accessing a plurality of additional target images representing associated target outputs of image enhancement the machine learning model;
generating, for the plurality of additional target images, an associated input image corresponding to the plurality of additional target images; and
training the image enhancement machine learning model using (a) the at least one target image and a generated input image corresponding to the at least one target image and (b) the plurality of additional target images and the generated associated input image, to obtain a trained machine learning model.

14. An apparatus for training a machine learning model for enhancing images, the apparatus comprising:
at least one processor; and
at least one non-transitory computer-readable storage medium storing processor-executable instructions that, when executed by the at least one processor, cause the apparatus to:
access a target image representing a target output of the machine learning model;
generate an input image corresponding to the target image, comprising:
identifying a first target image pixel value;
identifying a first set of predetermined pixel values, associated with one or more potential dark pixel values associated with pixels in the target image, based on the first target image pixel value;
selecting a first reference pixel value, based on a reference image, in response to determining that the first reference pixel value is a closest match to the one or more potential dark pixel values:
selecting a pixel value, from the first set of predetermined pixel values, mapped to the first reference pixel value; and
setting a first pixel in the input image to the pixel value selected from the first set of predetermined pixel values; and
train the machine learning model using the target image and the generated input image corresponding to the target image to obtain a trained machine learning model.

15. The apparatus of claim 14, wherein when the at least one processor further executes the instructions, further causes the apparatus to:
identify a second pixel value at a second pixel in the target image;
identify a second set of predetermined pixel values based on the second pixel value;
select a pixel value from the second set of predetermined pixel values; and
set a second pixel in the input image to the pixel value selected from the second set of predetermined pixel values.

16. The apparatus of claim 14, wherein the identifying the first set of predetermined pixel values comprises:
accessing data mapping a first plurality of pixel values to the first reference pixel value and a second plurality of pixel values to a second reference pixel value;
selecting the first reference pixel value based on a first pixel value at a first pixel in the target image; and
identifying the first plurality of pixel values to be the first set of predetermined pixel values.

17. The apparatus of claim 14, wherein when the at least one processor further executes the instructions, further causes the apparatus to perform generating the first set of predetermined pixel values corresponding to the first target image pixel value.

18. The apparatus of claim 14, wherein when the at least one processor further executes the instructions, further causes the apparatus to:
access a plurality of images of a reference object;
identify sets of pixel values from the plurality of images corresponding to respective locations in the reference object;
for the sets of pixel values, determine a respective reference pixel value based on at least some pixel values in the set of pixel values; and
store a mapping of reference pixel values to respective pixel values of the sets of pixel values.

19. The apparatus of claim 18, wherein the identifying the first set of predetermined pixel values comprises:
identifying a first pixel value of the reference pixel values in the mapping based on the first pixel; and
identifying the first set of predetermined pixel values to be a set of pixel values mapped to the first reference pixel value in the mapping.

20. The apparatus of claim 14, wherein the selecting the pixel value from the first set of predetermined pixel values comprises randomly sampling the pixel value from the first set of predetermined pixel values.

21. The apparatus of claim 14, wherein when the at least one processor further executes the instructions, further cause the apparatus to:
access an image;
provide the image as input to the trained machine learning model to obtain a corresponding output indicating updated pixel values for the image; and
update the image using the output from the trained machine learning model.

22. The apparatus of claim 14, wherein when the at least one processor further executes the instructions, further cause the apparatus to:
access a plurality of additional target images representing associated target outputs of the machine learning model;
generate, for the plurality of additional target images, an associated input image corresponding to the plurality of additional target images; and
train the machine learning model using (a) the target image and the generated input image corresponding to the target image and (b) the plurality of additional target images and the generated associated input image, to obtain the trained machine learning model.

23. At least one non-transitory computer-readable storage medium storing processor-executable instructions that, when executed by at least one processor, cause the at least one processor to perform:
accessing a target image representing a target output of the machine learning model;

generating an input image corresponding to the target image, comprising:
  identifying a first target image pixel value associated with the target image;
  identifying a first set of predetermined pixel values, associated with one or more potential dark pixel values associated with pixels in the target image, based on the first target image pixel value;
  selecting a first reference pixel value, based on a reference image, in response to determining that the first reference pixel value is a closest match to the one or more potential dark pixel values;
  selecting a pixel value, from the first set of predetermined pixel values, mapped to the first reference pixel value; and
setting a first pixel in the input image to the pixel value selected from the first set of predetermined pixel values; and
training the machine learning model using the target image and the generated input image corresponding to the target image to obtain a trained machine learning model.

* * * * *

UNITED STATES PATENT AND TRADEMARK OFFICE
CERTIFICATE OF CORRECTION

| | |
|---|---|
| PATENT NO. | : 11,983,853 B1 |
| APPLICATION NO. | : 17/087491 |
| DATED | : May 14, 2024 |
| INVENTOR(S) | : Bo Zhu et al. |

It is certified that error appears in the above-identified patent and that said Letters Patent is hereby corrected as shown below:

On the Title Page

Column 1 item (73), Correct the Assignee's name to: Meta Platforms, Inc., Menlo Park, CA Signed and Sealed this
Ninth Day of July, 2024

Katherine Kelly Vidal
*Director of the United States Patent and Trademark Office*